United States Patent
Yoon et al.

(10) Patent No.: US 11,177,704 B2
(45) Date of Patent: Nov. 16, 2021

(54) INFERIOR PERMANENT MAGNET MOTOR

(71) Applicant: SAMSUNG ELECTRONICS CO., LTD., Suwon-si (KR)

(72) Inventors: Taeho Yoon, Suwon-si (KR); Junseok Kim, Suwon-si (KR); Hyungchul Lee, Suwon-si (KR); Byoungsoo Ko, Suwon-si (KR); Hongseok Kim, Suwon-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 251 days.

(21) Appl. No.: 16/432,658

(22) Filed: Jun. 5, 2019

(65) Prior Publication Data

US 2019/0379248 A1 Dec. 12, 2019

(30) Foreign Application Priority Data

Jun. 8, 2018 (KR) .................... 10-2018-0065894

(51) Int. Cl.
*H02K 1/27* (2006.01)
*H02K 1/14* (2006.01)
(Continued)

(52) U.S. Cl.
CPC .......... *H02K 1/2706* (2013.01); *F04D 25/06* (2013.01); *F25B 1/04* (2013.01); *H02K 1/02* (2013.01); *H02K 1/14* (2013.01); *H02K 3/18* (2013.01)

(58) Field of Classification Search
CPC .......... H02K 1/2706; H02K 1/14; H02K 1/02; H02K 3/18; H02K 1/2746; H02K 2213/03;
(Continued)

(56) References Cited

U.S. PATENT DOCUMENTS 5,371,426 A 12/1994 Nagate et al.
7,851,958 B2 * 12/2010 Cai .................. H02K 1/2766
310/156.53
(Continued)

FOREIGN PATENT DOCUMENTS

DE 102008041660 3/2010
JP 2004-201406 7/2004
(Continued)

OTHER PUBLICATIONS

Extended European Search Report dated Feb. 19, 2021 from European Application No. 19815459.3, 11 pages.
(Continued)

*Primary Examiner* — Tulsidas C Patel
*Assistant Examiner* — Riley Owen Stout
(74) *Attorney, Agent, or Firm* — Staas & Halsey, LLP

(57) ABSTRACT

An interior permanent magnet motor includes a stator provided with a plurality of slots and a rotor rotatably disposed inside the stator. A plurality of permanent magnets of the same polarity are disposed at equal intervals in a circumferential direction inside the rotor. A plurality of flux bathers are provided on left and right sides of one end of each of the plurality of permanent magnets adjacent to an outer circumferential surface of the rotor. A ratio of a number of slots of the stator to a number of magnetic poles of the rotor is 3:2 or 3:4. The number of permanent magnets provided in the rotor is ½ of the number of magnetic poles of the rotor.

20 Claims, 27 Drawing Sheets

(51) Int. Cl.
*F25B 1/04* (2006.01)
*H02K 1/02* (2006.01)
*F04D 25/06* (2006.01)
*H02K 3/18* (2006.01)

(58) Field of Classification Search
CPC .......... F25B 1/04; F25B 21/02; F25B 31/023; F25B 1/02; F04D 25/06; F04B 35/04; F04B 39/0253
See application file for complete search history.

(56) References Cited

U.S. PATENT DOCUMENTS

| | | | |
|---|---|---|---|
| 8,796,897 | B2 | 8/2014 | Taniguchi et al. |
| 2012/0098378 | A1 | 4/2012 | Takemoto et al. |
| 2014/0252904 | A1* | 9/2014 | Mikami .................. H02K 5/04 310/156.66 |
| 2015/0372548 | A1* | 12/2015 | Nigo ................... H02K 1/2773 310/156.01 |
| 2017/0018980 | A1* | 1/2017 | Yang ...................... H02K 29/03 |
| 2017/0110944 | A1 | 4/2017 | Nigo et al. |
| 2017/0279322 | A1* | 9/2017 | Sasaki .................. G01N 27/82 |
| 2019/0115810 | A1* | 4/2019 | Kinpara ................ H02K 1/148 |
| 2019/0199149 | A1 | 6/2019 | Oikawa et al. |

FOREIGN PATENT DOCUMENTS

| | | |
|---|---|---|
| JP | 2005-130604 | 5/2005 |
| JP | 2010-252530 | 11/2010 |
| JP | 2012-110213 | 6/2012 |
| JP | 5361942 | 12/2013 |
| JP | 2016-131491 | 7/2016 |
| JP | 2017-139877 | 8/2017 |
| KR | 10-1167806 | 7/2012 |
| KR | 10-1231024 | 2/2013 |
| KR | 10-2015-0050464 | 5/2015 |
| KR | 10-2015-0115319 | 10/2015 |
| KR | 10-2017-0072056 | 6/2017 |
| WO | 92/09132 | 5/1992 |
| WO | 2017/221341 | 12/2017 |

OTHER PUBLICATIONS

International Search Report and Written Opinion of the International Searching Authority dated Sep. 19, 2019 in International Patent Application No. PCT/KR2019/006753.

* cited by examiner

INFERIOR PERMANENT MAGNET MOTOR

CROSS-REFERENCE TO RELATED APPLICATIONS

This application is based on and claims priority under 35 U.S.C. § 119 to Korean Patent Application No. 10-2018-0065894, filed on Jun. 8, 2018, in the Korean Intellectual Property Office, the disclosure of which is incorporated by reference herein in its entirety.

BACKGROUND

1. Field

The disclosure relates to an interior permanent magnet motor, and more particularly, to an interior permanent magnet motor having consequent poles.

2. Description of the Related Art

Generally, an interior permanent magnet motor includes a stator provided with a plurality of teeth wound with coils and a rotor into which a plurality of permanent magnets are inserted.

An interior permanent magnet motor 1000 according to the prior art is illustrated in FIG. 1.

Referring to FIG. 1, the conventional interior permanent magnet motor 1000 includes a stator 1110 and a rotor 1120.

The inner surface of the stator 1110 is formed in a cylindrical shape and a plurality of teeth 1113 protrude from the inner surface of the stator 1110 toward the center of the stator 1110. The plurality of teeth 1113 are spaced apart from each other by a predetermined interval in the circumferential direction of the stator 1110, and coils (not illustrated) are intensively wound around each of the plurality of teeth 1113.

The rotor 1120 is formed in a cylindrical shape, and is disposed to be rotatable coaxially with the stator 1110. Inside the rotor 1120, a plurality of permanent magnets 1130 and 1131 are provided at regular intervals in the circumferential direction. The plurality of permanent magnets 1130 and 1131 include P permanent magnets having different poles. The plurality of permanent magnets 1130 and 1131 are arranged such that adjacent two permanent magnets have different poles. For example, as illustrated in FIG. 1, the permanent magnets 1130 of N pole and the permanent magnets 1131 of S pole are alternately arranged in the circumferential direction of the rotor 1120.

When the current is applied to the plurality of coils of the conventional interior permanent magnet motor 1000 having such a structure, the rotor 1120 is rotated by the attractive force and the repulsive force generated between the plurality of coils of the stator 1110 and the plurality of permanent magnets 1130 and 1131 of the rotor 1120.

In order to improve the performance of the conventional interior permanent magnet motor, it is necessary to increase the magnetic flux amount. In order to increase the magnetic flux amount of the motor, the thickness of the permanent magnet may be increased, or a permanent magnet made of a rare earth material having a high residual magnetic flux density may be used.

However, increasing the thickness of the permanent magnet or using a rare-earth permanent magnets as described above increases the material cost.

Therefore, it is required to develop a motor capable of reducing the amount of permanent magnets used while satisfying performance required in the market.

SUMMARY

An aspect of the disclosure relates to an interior permanent magnet motor capable of reducing the number of permanent magnets and exhibiting high performance.

According to an aspect of the disclosure, an interior permanent magnet motor may include a stator provided with a plurality of slots; a rotor rotatably disposed inside the stator; a plurality of permanent magnets disposed at equal intervals in a circumferential direction inside the rotor and having an equal polarity; and a plurality of flux barriers provided on left and right sides of one end of each of the plurality of permanent magnets adjacent to an outer circumferential surface of the rotor, wherein a ratio of a number of slots of the stator to a number of magnetic poles of the rotor is 3:2 or 3:4, and wherein a number of the plurality of permanent magnets provided in the rotor is ½ of the number of magnetic poles of the rotor.

A pole arc angle $\theta m$ of each of the plurality of permanent magnets may satisfy following formulas:

$$\theta n \leq \theta m < \theta m + \theta s/2$$

$$\theta n = 360/P$$

$$\theta s = 360/S$$

where P is the number of magnetic poles of the rotor, and S is the number of slots of the stator.

A pole arc angle $\theta m$ of each of the plurality of permanent magnets and the plurality of flux barriers may satisfy following formulas:

$$\theta s/2 \leq \theta ib < \theta n$$

$$\theta n \leq \theta m < \theta ob$$

$$\theta m < \theta ob < \theta m + \theta s$$

$$\theta n = 360/P$$

$$\theta s = 360/S$$

where $\theta ib$ is an inner flux bather angle of the permanent magnet, $\theta ob$ is an outer flux barrier angle of the permanent magnet, P is the number of magnetic poles of the rotor, and S is the number of slots of the stator.

An angle $\theta cp$ of a consequent pole formed between two adjacent permanent magnets among the plurality of permanent magnets may satisfy a following formula:

$$\theta ib/2 < \theta cp < \theta ob$$

A number of magnetic poles of the rotor may satisfy a following formula:

$$P = 2N$$

where N is a natural number and satisfies $2 \leq N \leq 8$.

The rotor may be formed in a cylindrical shape, and the plurality of flux barriers may be formed as a plurality of voids adjacent to the outer circumferential surface of the rotor and provided at predetermined intervals in the circumferential direction of the rotor.

The rotor may include a plurality of magnet insertion holes in which the plurality of permanent magnets are disposed, a left flux barrier and a right flux barrier may be provided on left and right sides of both ends of each of the plurality of magnet insertion holes, and the magnet insertion hole may be in fluid communication with the left flux barrier and the right flux barrier.

A partition wall may be provided between the magnet insertion hole and each of the left flux barrier and the right flux barrier.

The stator may include a plurality of teeth protruding from an inner circumferential surface of a cylindrical yoke toward a center of the stator, and the stator may be a concentric winding type in which coils are intensively wound on each of the plurality of teeth.

Each of the plurality of teeth may be provided with a step portion including at least one step surface facing the rotor.

The interior permanent magnet motor may include a rotation shaft disposed at a center of the rotor and a plurality of inner flux barriers formed between the rotation shaft and the plurality of permanent magnets.

The plurality of permanent magnets may be formed of ferrite or rare earth material.

Each of the plurality of permanent magnets may be formed in any one of a V shape, a C shape, and a U shape.

According to another aspect of the disclosure, an interior permanent magnet motor may include a stator provided with a plurality of slots; a rotor rotatably disposed inside the stator; a plurality of permanent magnets disposed at equal intervals in a circumferential direction inside the rotor and having an equal polarity; a rotation shaft disposed at a center of the rotor; and a plurality of left flux barriers and a plurality of right flux barriers provided on left and right sides of one end of each of the plurality of permanent magnets adjacent to an outer circumferential surface of the rotor, wherein a number of the plurality of permanent magnets provided in the rotor is ½ of a number of magnetic poles of the rotor.

BRIEF DESCRIPTION OF THE DRAWINGS

These and/or other aspects of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE EXEMPLARY EMBODIMENTS

Hereinafter, embodiments of an interior permanent magnet motor according to the disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

The terms 'first', 'second', etc. may be used to describe diverse components, but the components are not limited by the terms. The terms may only be used to distinguish one component from the others. For example, without departing from the scope of the present disclosure, a first component may be referred to as a second component, and similarly, a second component may also be referred to as a first component.

The terms used in embodiments of the present disclosure may be construed as commonly known to those skilled in the art unless otherwise defined.

Further, the terms 'leading end', 'rear end', 'upper side', 'lower side', 'top end', 'bottom end', etc. used in the present disclosure are defined with reference to the drawings. However, the shape and position of each component are not limited by the terms.

Figure 1:
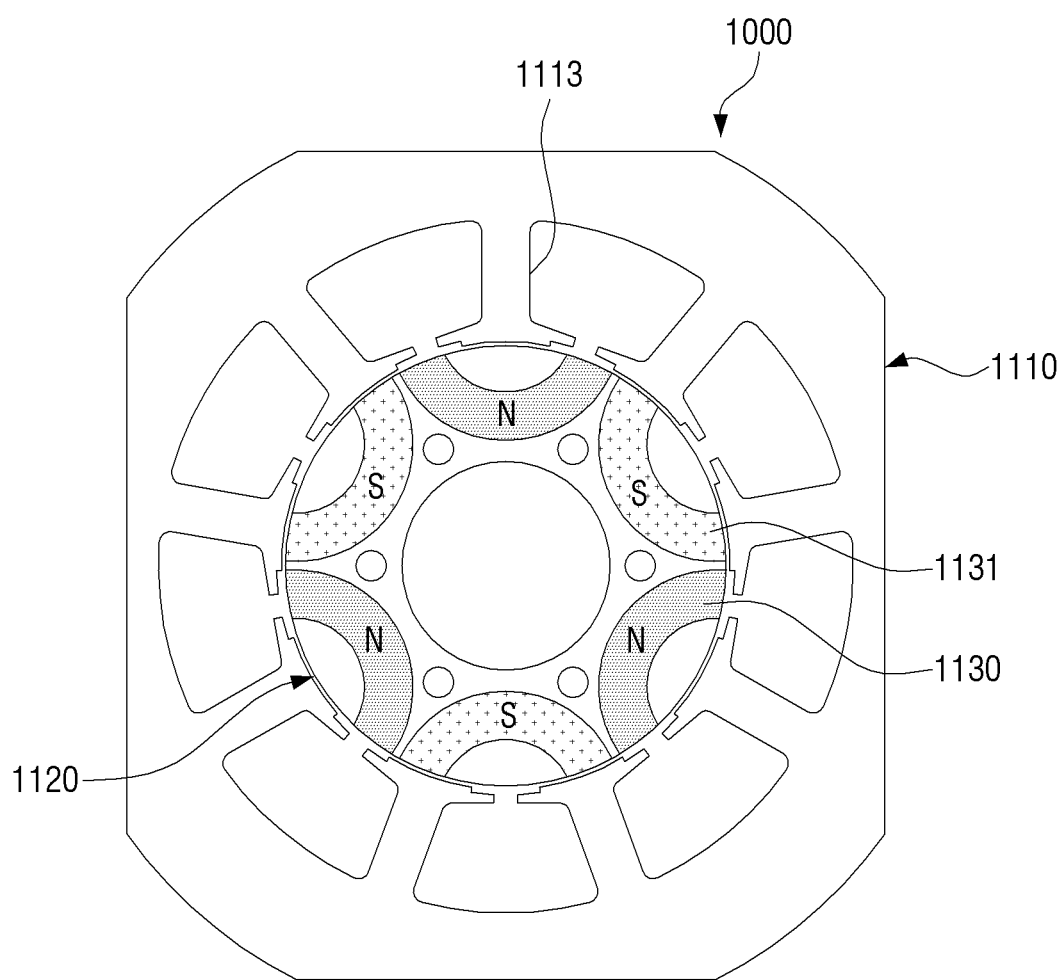
FIG. 1 is a cross-sectional view illustrating an interior permanent magnet motor according to the prior art.
Figure 2:
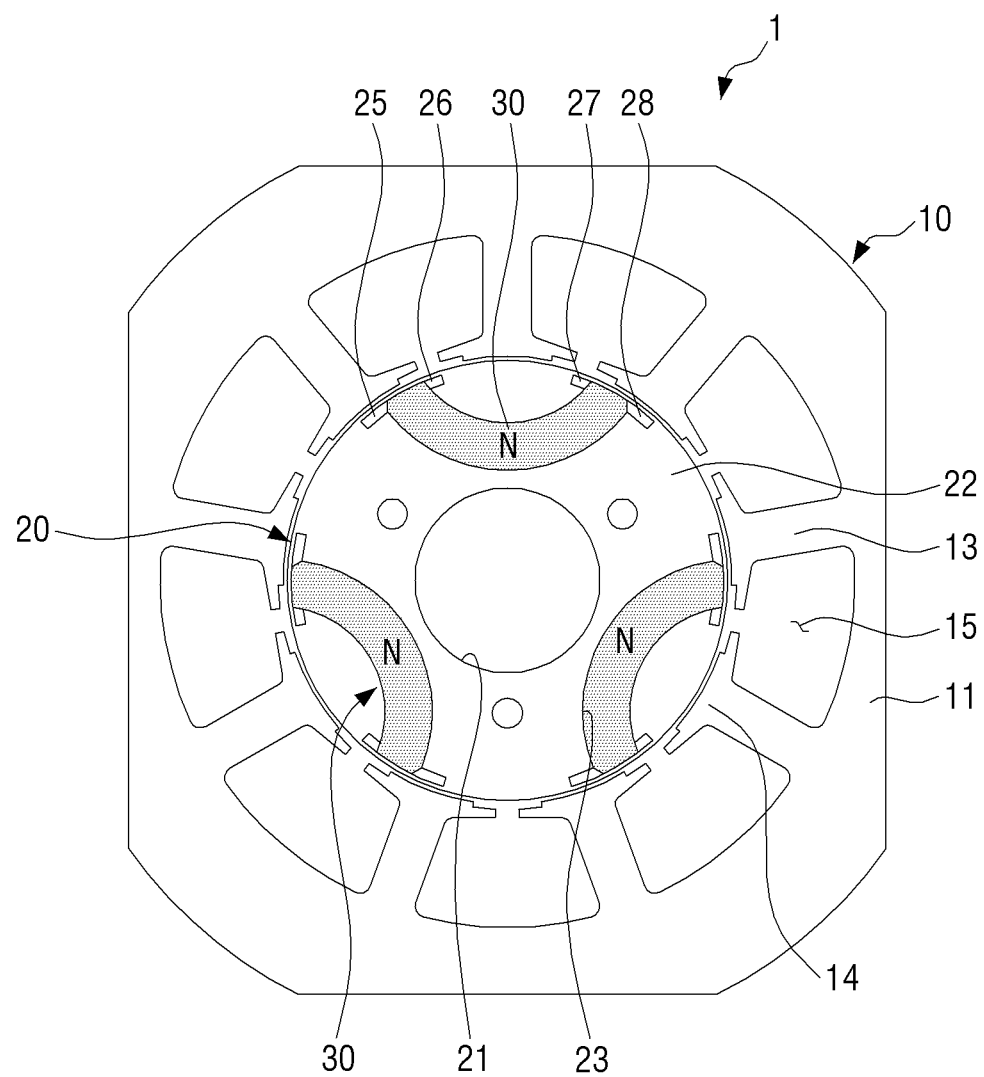
FIG. 2 is a cross-sectional view illustrating an interior permanent magnet motor according to an embodiment of the disclosure.
Figure 3:
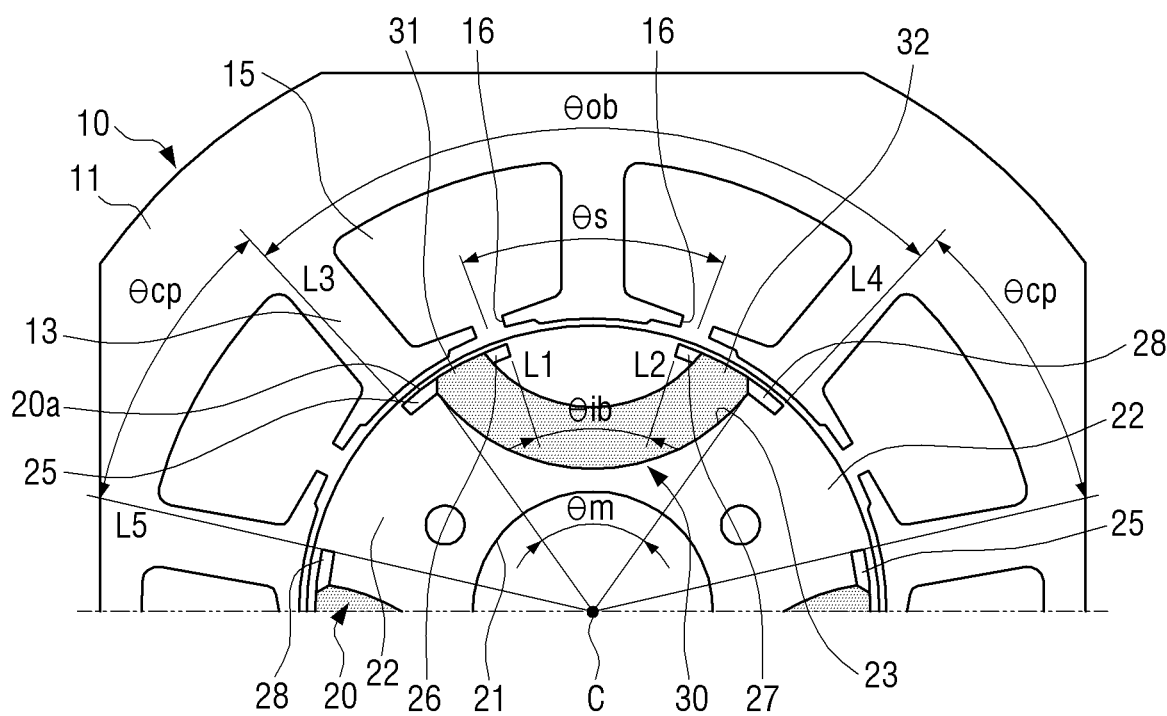
FIG. 3 is a partially enlarged cross-sectional view illustrating an interior permanent magnet motor according to an embodiment of the disclosure.
Figure 4:
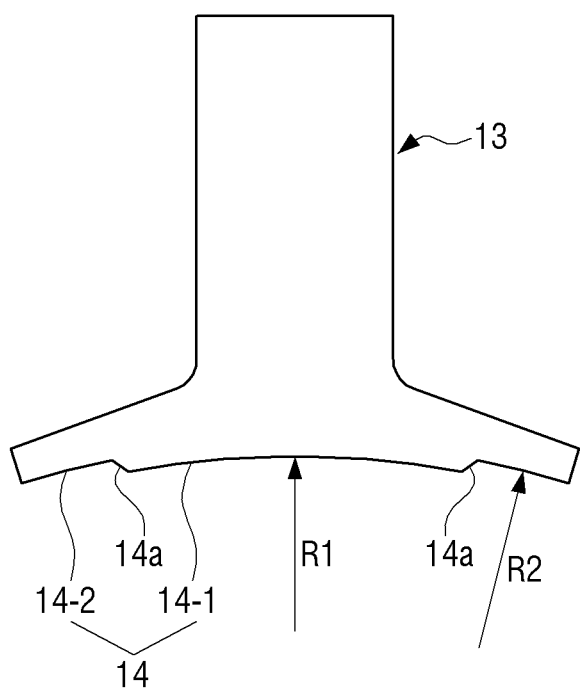
FIG. 4 is a view illustrating a tooth of a stator of an interior permanent magnet motor according to an embodiment of the disclosure.

FIG. 2 is a cross-sectional view illustrating an interior permanent magnet motor according to an embodiment of the disclosure. FIG. 3 is a partially enlarged cross-sectional view illustrating an interior permanent magnet motor according to an embodiment of the disclosure. FIG. 4 is a view illustrating a tooth of a stator of an interior permanent magnet motor according to an embodiment of the disclosure.

Referring to FIGS. 2 and 3, an interior permanent magnet motor 1 according to an embodiment of the disclosure may include a stator 10 and a rotor 20.

The stator 10 includes a yoke portion 11 having an inner surface formed in a cylindrical shape and a plurality of teeth 13 protruding toward the center of the stator 10 from the inner surface of the yoke portion 11. The plurality of teeth 13 are spaced apart from each other by a predetermined interval in the circumferential direction of the inner surface of the stator 10 and a plurality of slots 15 in which the coils are accommodated are formed between the plurality of teeth 13. The coils are intensively wound around each of the plurality of teeth 13. In other words, the stator 10 may be formed as a concentrated winding type stator.

As illustrated in FIG. 4, a step portion 14 may be provided on the surface of the tooth 13 of the stator 10 facing the rotor 20. The step portion 14 is formed so that a left step portion and a right step portion are symmetrical with respect to the center line in the longitudinal direction of the tooth 13 of the stator 10.

The step portion 14 may include at least two step surfaces 14-1 and 14-2 having different radii from the center of the stator 10. The step portion 14 of the tooth 13 of the stator 10 as illustrated in FIG. 4 includes two step surfaces, that is, a first step surface 14-1 and a second step surface 14-2. The radius R1 of the first step surface 14-1 is formed to be smaller than the radius R2 of the second step surface 14-2. The left end and the right end of the first step surface 14-1 are connected to the second step surface 14-2 by an inclined surface 14a. The inclination angle of the inclined surface 14a may be 90 degrees or more. By forming the step portion 14 in the tooth 13 of the stator 10 as described above, abrupt changes of the magnetic flux in the surface of the rotor 20 may be alleviated.

The rotor 20 is formed in a cylindrical shape and is disposed to be rotatable coaxially with the stator 10. The rotor 20 is disposed to be rotatable about the center of the stator 10 at a predetermined gap from the step portions 14 of the teeth 13 of the stator 10. For this purpose, a through hole 21 is formed at the center of the rotor 20, in which a rotation shaft (not illustrated) is disposed.

A plurality of permanent magnets 30 are provided inside the rotor 20 at predetermined intervals in the circumferential direction of the rotor 20. In detail, the plurality of permanent magnets 30 are provided between the through hole 21 and the outer circumferential surface of the rotor 20. Each of the plurality of permanent magnets 30 may be formed in a substantially C shape, which is a magnetic flux concentration type as illustrated in FIGS. 2 and 3. Further, the plurality of permanent magnets 30 may be formed of ferrite or rare earth material. For example, the plurality of permanent magnets 30 may be formed of neodymium Nd.

The rotor 20 is formed of iron cores and a plurality of magnet insertion holes 23 in which the permanent magnets 30 are disposed are formed at equal intervals in the circumferential direction of the rotor 20. Each of the plurality of magnet insertion holes 23 is formed in a substantially C shape corresponding to the shape of the permanent magnet 30.

The plurality of permanent magnets 30 provided in the rotor 20 all have the same polarity. When the plurality of permanent magnets 30 having the same polarity are provided in the rotor 20, a portion 22 of the rotor 20, that is, a portion of the iron core, between the adjacent two permanent magnets 30 is magnetized in the opposite polarity to the polarity of the permanent magnets 30. An example in which the rotor 20 is magnetized is shown in FIG. 5.

Figure 5:
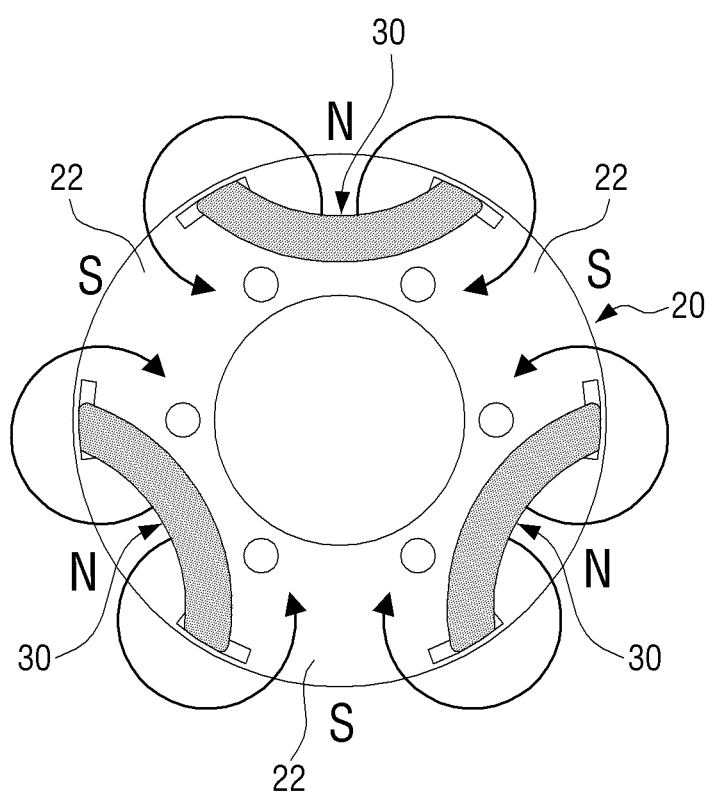
FIG. 5 is a view illustrating a state where a rotor of an interior permanent magnet motor according to an embodiment of the disclosure is magnetized.

FIG. 5 is a view illustrating a state where a rotor of an interior permanent magnet motor according to an embodiment of the disclosure is magnetized.

In a case of the embodiment of FIG. 5, three N-pole permanent magnets 30 are inserted into the rotor 20, and the iron core portion 22 between the N-pole permanent magnet 30 and the N-pole permanent magnet 30 is magnetized to the S-pole, thereby forming a consequent pole. Therefore, even when the plurality of permanent magnets 30 having the same polarity are used in the rotor 20, the same magnetic field as that of a conventional motor using a plurality of permanent magnets having different polarities is formed.

The number of the magnetic poles (or the magnetic pole number) of the rotor 20 includes the number of the permanent magnets 30 and the number of consequent poles 22. For example, when three permanent magnets 30 are provided in the rotor 20 as illustrated in FIG. 5, three consequent poles 22 are formed between the three permanent magnets 30, so that the number of the magnetic poles of the rotor 20 is six. Therefore, in the interior permanent magnet motor 1 according to the present embodiment, the number of the permanent magnets 30 provided in the rotor 20 is half the number of magnetic poles of the rotor 20.

The number P of magnetic poles of the rotor 20 used in the interior permanent magnet motor 1 according to an embodiment of the disclosure may satisfy the following formula.

$$P=2N$$

Here, N is a natural number and satisfies $2 \leq N \leq 8$.

Therefore, the number of the permanent magnets 30 provided in the rotor 20 is P/2.

On the other hand, the number of magnetic poles of the rotor 20 may have a predetermined relationship with the number of the slots 15 of the stator 10. For example, the ratio of the number of slots 15 of the stator 10 to the number of magnetic poles of the rotor 20 may be 3:2 or 3:4. When the number of slots 15 of the stator 10 is nine and the number of magnetic poles of the rotor 20 is six, the ratio of the number of slots 15 of the stator 10 to the number of magnetic poles of the rotor 20 is 3:2.

As another example, when the number of slots 15 of the stator 10 is six and the number of magnetic poles of the rotor 20 is eight, the ratio of the number of slots 15 of the stator 10 to the number of magnetic poles of the rotor 20 is 3:4.

With the interior permanent magnet motor according to an embodiment of the disclosure having the above-described structure, the effective magnetic flux amount may be maximized even when the number of the permanent magnets is halved compared to the conventional interior permanent magnet motor.

Further, the interior permanent magnet motor according to an embodiment of the disclosure includes flux barriers disposed on the left and right sides of one end of the permanent magnet to reduce the leakage magnetic flux and alleviate abrupt change in the magnetic flux flowing from the rotor to the stator. Therefore, the distortion rate of the counter electromotive force and the torque ripple may be implemented almost the same as the conventional interior permanent magnet motor.

Therefore, with the interior permanent magnet motor according to an embodiment of the disclosure, the number of permanent magnets may be reduced to half and the performance equivalent to that of the conventional interior permanent magnet motor may be achieved.

Flux barriers 25, 26, 27, and 28 are provided on the left and right sides of the opposite ends of each of the permanent magnets 30 adjacent to the outer circumferential surface of the rotor 20, that is, a first end 31 and a second end 32. In other words, as illustrated in FIG. 2, the flux barriers 25, 26, 27, and 28 are provided on the left and right sides of one end of each of the plurality of permanent magnets 30 adjacent to the outer circumferential surface of the rotor 20.

The plurality of flux barriers 25, 26, 27, and 28 may be formed in a plurality of voids adjacent to the outer circumferential surface of the rotor 20 and provided at predetermined intervals in the circumferential direction of the rotor 20. In other words, each of the flux barriers 25, 26, 27, and 28 is formed along the outer circumferential surface of the rotor 20 with a predetermined width and length. For example, each of the flux barriers 25, 26, 27, and 28 may be formed in a substantially rectangular hole. Therefore, the flux barriers 25, 26, 27, and 28 are not opened toward the teeth 13 of the stator 10, and iron core portions 20a forming the outer circumferential surface of the rotor 20 are present between the flux barriers 25, 26, 27, and 28 and the teeth 13 of the stator 10.

The plurality of flux barriers 25, 26, 27, and 28 are in fluid communication with the plurality of magnet insertion holes 23 formed in the rotor 20. For example, the flux barriers 25, 26, 27, and 28 may be formed to protrude laterally from the magnet insertion holes 23 along the outer circumferential surface of the rotor 20. Because the plurality of flux barriers 25, 26, 27, and 28 all have the same structure, the two flux barriers 25, 26, 27, and 28 provided at opposite ends of the one magnet insertion hole 23 will be described in detail with reference to FIG. 3.

When the permanent magnet 30 is inserted into the magnet insertion hole 23, the ends 31 and 32 of the permanent magnet 30 are positioned in the flux barriers 25, 26, 27, and 28, respectively. Therefore, left flux barriers 25 and 27 and right flux barriers 26 and 28 may be positioned on the left and right sides of the ends 31 and 32 of the permanent magnet 30, respectively. In other words, the left flux bather 25 and the right flux barrier 26 are provided on the left and right sides of the first end 31 of the permanent magnet 30. The left flux barrier 27 and the right flux barrier 28 are also provided on the left and right sides of the second end 32 of the permanent magnet 30. The left flux barriers 25 and 27 and the right flux barriers 26 and 28 all are in fluid communication with the magnet insertion hole 23.

Hereinafter, the dimensional relationship of the permanent magnets 30 and the flux barriers 25, 26, 27, and 28 used in the interior permanent magnet motor 1 according to an embodiment of the disclosure will be described with reference to FIG. 3. For reference, because the plurality of permanent magnets 30 and the corresponding plurality of flux barriers 25, 26, 27, and 28 are formed identically, hereinafter, the dimensional relationship of the permanent magnets 30 and the flux barriers 25, 26, 27, and 28 will be described on the basis of one permanent magnet 30 and two flux barriers 25, 26, 27, and 28 provided on the opposite ends of the permanent magnet 30.

The pole arc angle θm of the permanent magnet 30 may be formed to satisfy the following formula. Here, the pole arc angle θm refers to an angle between two straight lines connecting the center C of the rotor 20 and the opposite ends of the permanent magnet 30.

$$\theta n \leq \theta m < \theta m + \theta s/2$$

$$\theta n = 360/P$$

$$\theta s = 360/S$$

Here, P is the number of magnetic poles of the rotor 20, and S is the number of slots 15 of the stator 10.

Therefore, θn may be the magnetic pole angle of the rotor 20, and θs may be the slot angle of the stator 10.

In the conventional permanent magnet having six magnetic pole number, the pole arc angle of the permanent magnet is 60 degrees or less. Therefore, when the pole arc angle θm of the permanent magnets 30 satisfies the above condition as in the present disclosure, the effective magnetic flux amount may be maximized.

Further, the pole arc angle θm of the permanent magnet 30, the flux barriers 25, 26, 27, and 28, and the slots 15 of the stator 10 may be formed to satisfy the following formulas.

$$\theta s/2 \leq \theta ib < \theta m < \theta ob$$

$$\theta s/2 \leq \theta ib < \theta n$$

$$\theta n \leq \theta m < \theta ob$$

$\theta m < \theta ob < \theta m + \theta s$ $\theta n = 360/P$ $\theta s = 360/S$ Here, θib is an inner flux barrier angle of the permanent magnet 30, θob is an outer flux barrier angle of the permanent magnet 30, P is the number of magnetic poles of the rotor 20, and S is the number of slots 15 of the stator 10.

The inner flux barrier angle θib of the permanent magnet 30 is an angle between two straight lines connecting the closest ends of the two flux barriers 26 and 27 provided at both ends of the permanent magnet 30 to the center C of the rotor 20. In other words, in FIG. 3, the inner flux barrier angle θib of the permanent magnet 30 refers to an angle between a first straight line L1 connecting the center C of the rotor 20 and the right end of the right flux barrier 26 provided at the first end 31 of the permanent magnet 30 and a second straight line L2 connecting the center C of the rotor 20 and the left end of the left flux barrier 27 provided at the second end 32 of the permanent magnet 30.

The outer flux barrier angle θob of the permanent magnet 30 is an angle between two straight lines connecting the farthest ends of the two flux barriers 25 and 28 provided at both ends of the permanent magnet 30 to the center C of the rotor 20. In other words, in FIG. 3, the outer flux barrier angle θob of the permanent magnet 30 refers to an angle between a first straight line L3 connecting the center C of the rotor 20 and the left end of the left flux barrier 25 provided at the first end 31 of the permanent magnet 30 and a second straight line L4 connecting the center C of the rotor 20 and the right end of the right flux barrier 28 provided at the second end 32 of the permanent magnet 30.

When the flux barriers 25, 26, 27, and 28 satisfy the above conditions, the flux barriers 25, 26, 27, and 28 are positioned in the open slots 16 of the stator 10. Here, the open slot 16 is between two adjacent teeth 13 of the stator 10 and is a portion where the slot 15 is opened. In FIG. 3, the inner flux barriers 26 and 27 are positioned at the open slots 16 of the stator 10. Therefore, the flux barriers 25, 26, 27, and 28 may reduce the leakage magnetic flux so as to alleviate the abrupt change of the magnetic flux and make the voltage induced in the motor 1 sinusoidal. Here, the inner flux barriers 26 and 27 refer to the flux barriers located between the outer circumferential surface of the rotor 20 and the permanent magnet 30. In other words, in FIG. 3, the right flux barrier 26 of the first end 31 of the permanent magnet 30 and the left flux barrier 27 of the second end 32 thereof correspond to the inner flux barriers.

Further, the flux barriers 25 and 28 positioned outside the permanent magnet 30 may be referred to as outer flux barriers. In other words, in FIG. 3, the left flux barrier 25 of the first end 31 of the permanent magnet 30 and the right flux barrier 28 of the second end 32 thereof correspond to the outer flux barriers.

The angle θcp of the consequent pole 22 formed between two adjacent permanent magnets 30 among the plurality of permanent magnets 30 of the rotor 20 may satisfy the following formula.

$\theta ib/2 < \theta cp < \theta ob$

Here, the angle θcp of the consequent pole 22 refers to an angle between two straight lines connecting the nearest ends of the flux barriers 25 and 28 provided at one end of each of the adjacent two permanent magnets 30 to the center C of the rotor 20. For example, in FIG. 3, the consequent pole angle θcp refers to an angle between a first straight line L3 connecting the center C of the rotor 20 and the left end of the left flux barrier 25 provided at one end 31 of the first permanent magnet 30 and a second straight line L5 connecting the center C of the rotor 20 and the right end of the right flux barrier 28 provided at one end 32 of the second permanent magnet 30.

When the flux barriers 25, 26, 27, and 28 are provided at both ends of the permanent magnet 30 as described above, the waveform of the voltage induced in the motor 1 may become bilaterally symmetrical and the distortion rate (THD: total harmonic distortion) of the counter electromotive force and the torque ripple may be reduced.

Figure 6:
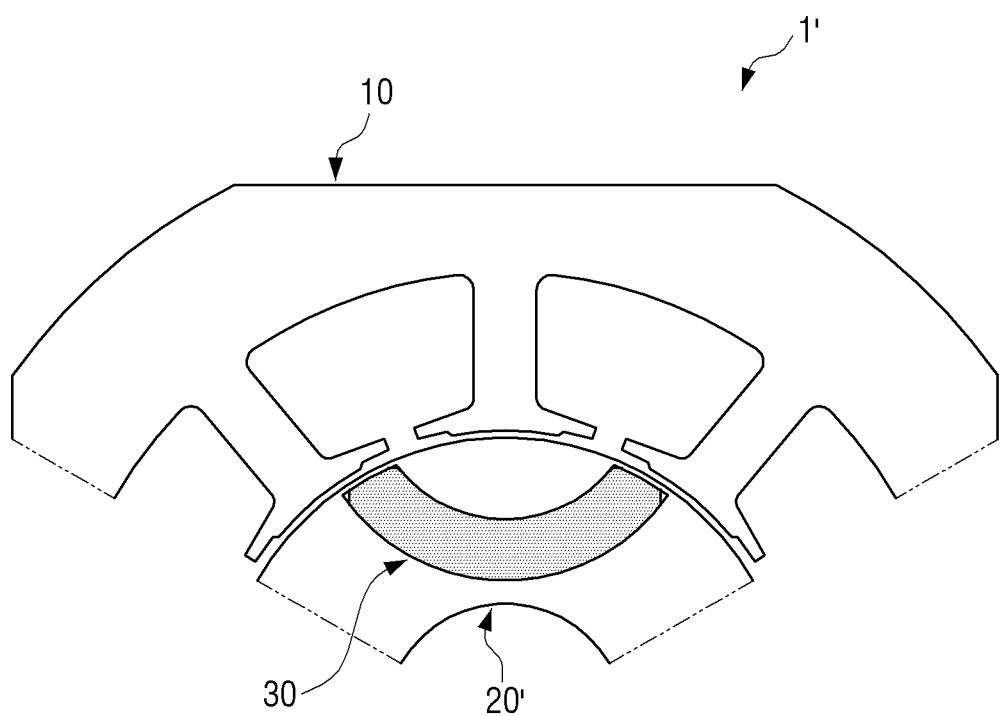
FIG. 6 is a partially enlarged cross-sectional view illustrating a case in which a rotor of an interior permanent magnet motor according to an embodiment of the disclosure has no flux barrier.

FIG. 6 is a partially enlarged cross-sectional view illustrating a case in which a rotor of an interior permanent magnet motor according to an embodiment of the disclosure has no flux barrier.

Referring to FIG. 6, there is no flux barrier at both ends of the permanent magnet 30 of the rotor 20' unlike FIGS. 2 and 3. Graphs in which the waveform of the voltage induced in the motor, the torque ripple, and the distortion rate of the counter electromotive force of the interior permanent magnet motor 1 having flux barriers 25, 26, 27, and 28 at both ends of the permanent magnets 30 as illustrated in FIGS. 2 and 3 are compared with those of the interior permanent magnet motor 1' having no flux barrier at both ends of the permanent magnets 30 as illustrated in FIG. 6 are illustrated in FIGS. 7, 8, and 9.

Figure 7:
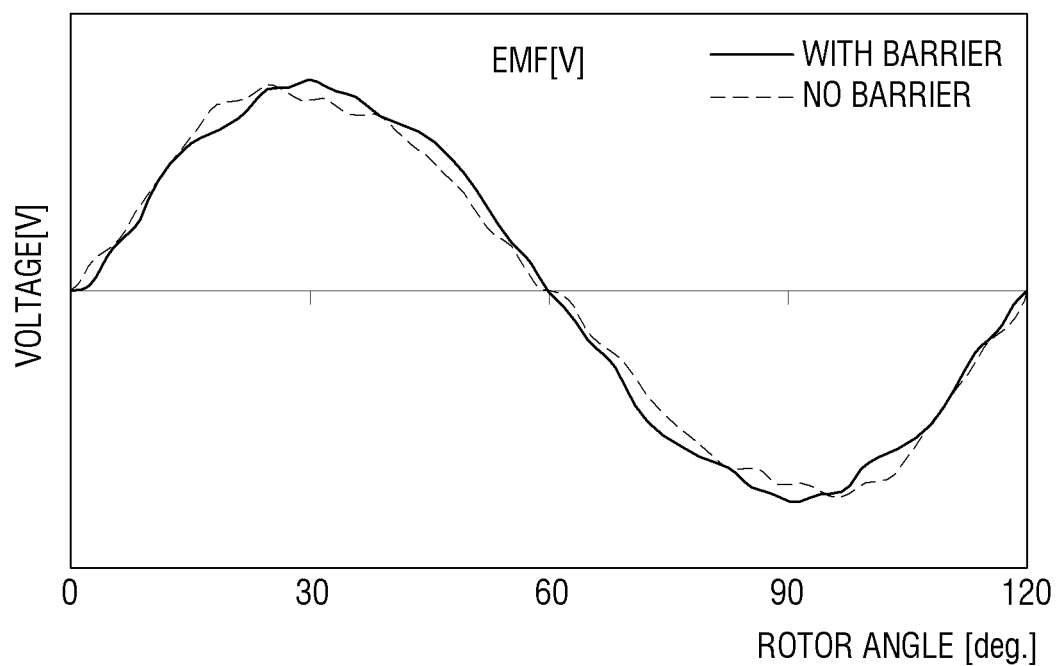
FIG. 7 is a graph illustrating the waveform of voltage induced in an interior permanent magnet motor according to an embodiment of the disclosure when a rotor of the motor has flux barriers and when the rotor of the motor has no flux barrier.

FIG. 7 is a graph illustrating the waveform of voltage induced in an interior permanent magnet motor according to an embodiment of the disclosure when a rotor of the motor has flux barriers and when the rotor of the motor has no flux barrier. In FIG. 7, the horizontal axis represents the rotor angle (degrees), and the vertical axis represents the voltage (V).

Referring to FIG. 7, in the case of the interior permanent magnet motor 1 having the rotor 20 provided with the flux barriers 25, 26, 27, and 28, the waveform of the voltage induced in the motor 1 is sinusoidal and bilaterally symmetrical. However, in the case of the interior permanent magnet motor 1' having the rotor 20' without the flux barrier, the waveform of the voltage induced in the motor 1' is not bilaterally symmetrical.

Figure 8:
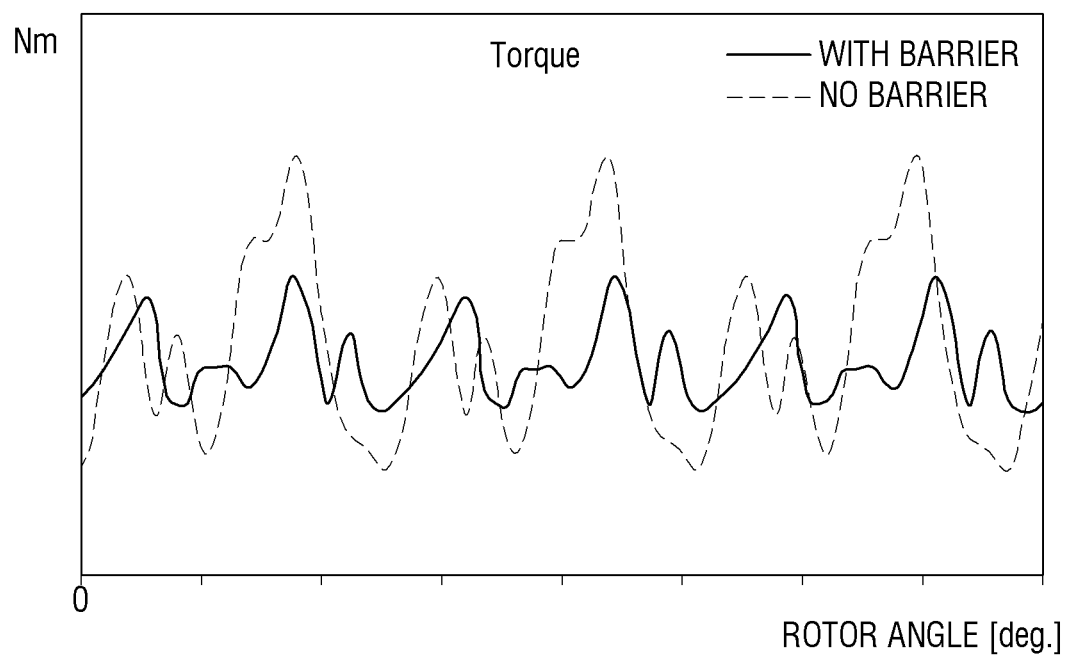
FIG. 8 is a graph illustrating the torque ripple of an interior permanent magnet motor according to an embodiment of the disclosure when a rotor of the motor has flux barriers and when the rotor of the motor has no flux barrier.
Figure 9:
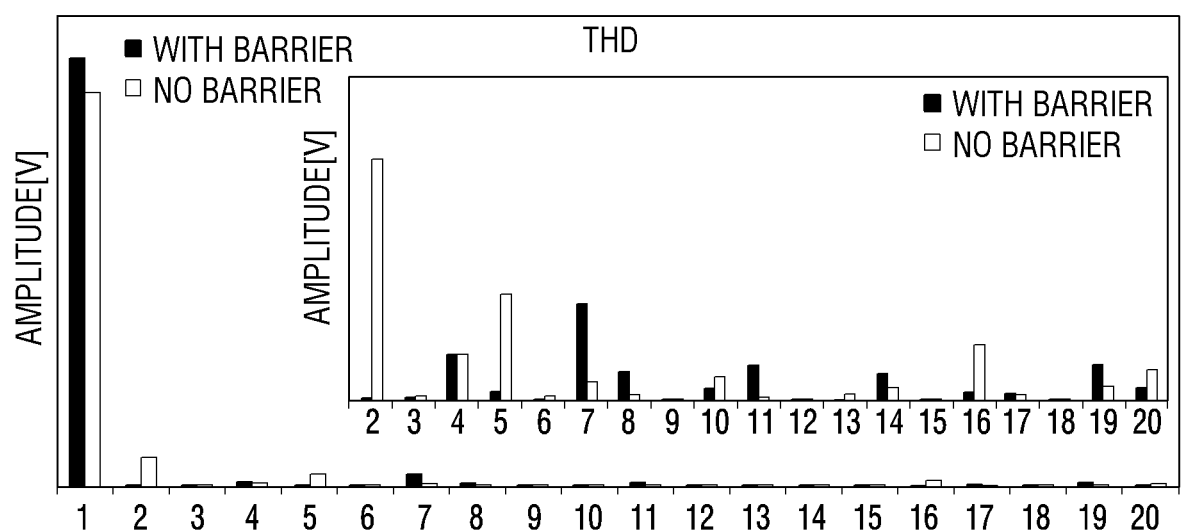
FIG. 9 is a graph illustrating the distortion rate of the counter electromotive force of an interior permanent magnet motor according to an embodiment of the disclosure when a rotor of the motor has flux barriers and when the rotor of the motor has no flux barrier.

FIG. 8 is a graph illustrating the torque ripple of an interior permanent magnet motor according to an embodiment of the disclosure when a rotor of the motor has flux barriers and when the rotor of the motor has no flux barrier. In FIG. 8, the horizontal axis represents the rotor angle (degrees), and the vertical axis represents the torque (Nm).

Referring to FIG. 8, in the case of the interior permanent magnet motor 1 having the rotor 20 provided with the flux barriers 25, 26, 27, and 28, the waveform of the voltage induced in the motor 1 is bilaterally symmetrical so that the torque ripple is small. However, in the case of the interior permanent magnet motor 1' having the rotor 20' having no flux barrier, the waveform of the voltage induced in the motor 1' is not bilaterally symmetrical so that the torque ripple is large.

FIG. 9 is a graph illustrating the distortion rate of the counter electromotive force of an interior permanent magnet motor according to an embodiment of the disclosure when a rotor of the motor has flux barriers and when the rotor of the motor has no flux barrier. In FIG. 9, the horizontal axis represents the order, and the vertical axis represents the amplitude (V). Further, the inner graph of FIG. 9 is an enlarged view of amplitudes corresponding to the orders 2 to 20 of the outer graph.

Referring to FIG. 9, in the case of the interior permanent magnet motor 1 having the rotor 20 provided with the flux barriers 25, 26, 27, and 28, the waveform of the voltage induced in the motor 1 is bilaterally symmetrical so that the distortion rate of the counter electromotive force is small. However, in the case of the interior permanent magnet motor 1' having the rotor 20' having no flux barrier, the waveform of the voltage induced in the motor 1' is not bilaterally symmetrical so that the distortion rate of the counter electromotive force is large.

The distortion rate may vary according to the inner flux barrier angle θib and the outer flux barrier angle θob.

Figure 10:
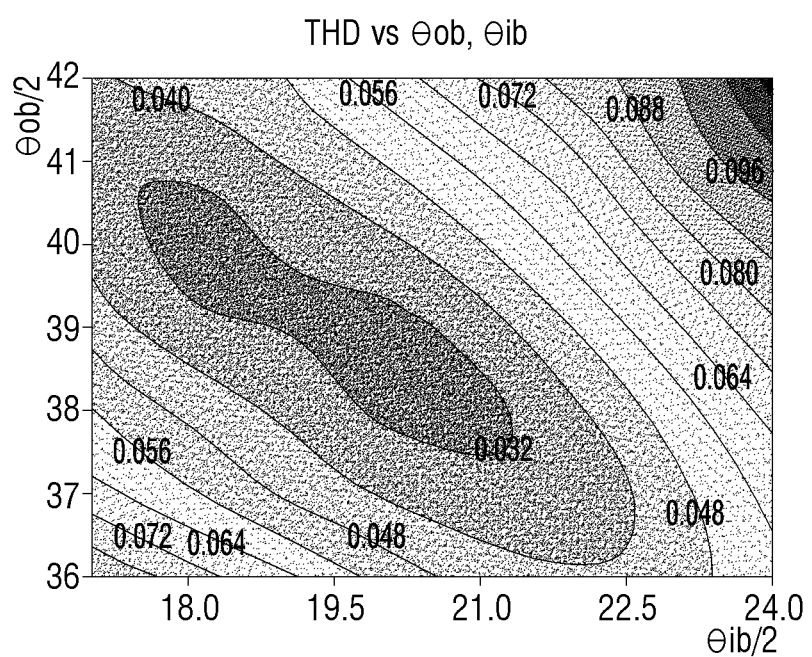
FIG. 10 is a distribution diagram illustrating the relationship between the inner flux barrier angle and the outer flux barrier angle of a rotor and the distortion rate of counter electromotive force of an interior permanent magnet motor according to an embodiment of the disclosure.

FIG. 10 is a distribution diagram illustrating the relationship between the inner flux barrier angle and the outer flux barrier angle of a rotor and the distortion rate of counter electromotive force of an interior permanent magnet motor according to an embodiment of the disclosure. In FIG. 10, the horizontal axis represents ½ of the inner flux barrier angle θib, the vertical axis represents ½ of the outer flux barrier angle θob, and the inner lines represent the distortion rate.

Therefore, the inner flux barrier angle θib and the outer flux barrier angle θob of the rotor 20 may be determined to be located inside the line indicated by 0.038 in FIG. 10.

Although the interior permanent magnet motor 1 using the C-shaped permanent magnets has been described above, the shape of the permanent magnets 30 used in the interior permanent magnet motor 1 according to an embodiment of the disclosure is not limited thereto.

Hereinafter, an interior permanent magnet motor according to an embodiment of the disclosure to which various shapes of permanent magnets are applied will be described with reference to the accompanying drawings.

Figure 11:
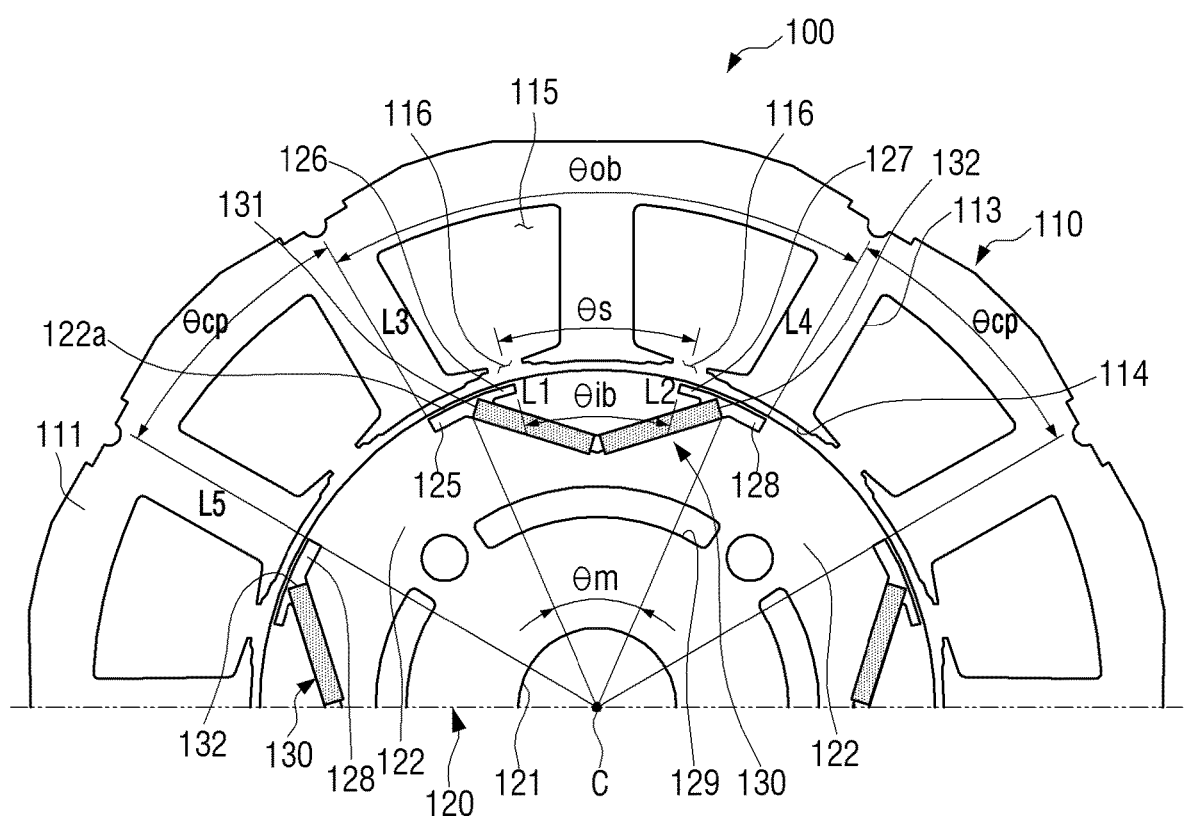
FIG. 11 is a partially enlarged cross-sectional view illustrating an interior permanent magnet motor according to an embodiment of the disclosure.
Figure 12:
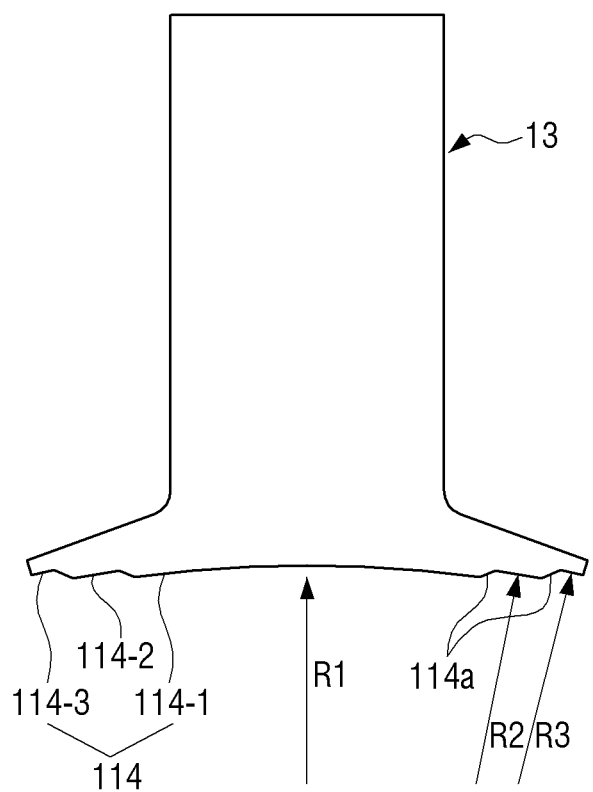
FIG. 12 is a view illustrating a tooth of a stator of the interior permanent magnet motor of FIG. 11.

FIG. 11 is a partially enlarged cross-sectional view illustrating an interior permanent magnet motor according to an embodiment of the disclosure, and FIG. 12 is a view illustrating a tooth of a stator of the interior permanent magnet motor of FIG. 11.

Referring to FIG. 11, an interior permanent magnet motor 100 according to an embodiment of the disclosure may include a stator 110 and a rotor 120.

The stator 110 includes a yoke portion 111 having an inner surface formed in a cylindrical shape and a plurality of teeth 113 protruding toward the center of the stator 110 from the inner surface of the yoke portion 111. The plurality of teeth 113 are spaced apart from each other by a predetermined interval in the circumferential direction of the inner surface of the stator 110 and a plurality of slots 115 in which the coils are accommodated are formed between the plurality of teeth 113. The coils are intensively wound around each of the plurality of teeth 113. In other words, the stator 110 may be formed as a concentrated winding type stator.

As illustrated in FIG. 12, a step portion 114 may be provided on the surface of the tooth 113 of the stator 110 facing the rotor 120. The step portion 114 is formed so that a left step portion and a right step portion are symmetrical with respect to the center line in the longitudinal direction of the tooth 113 of the stator 110.

The step portion 114 may include at least two step surfaces 114-1, 114-2, and 114-3 having different radii from the center of the stator 110. The step portion 114 of the tooth 113 of the stator 110 as illustrated in FIG. 12 includes three step surfaces, that is, a first step surface 114-1, a second step surface 114-2, and a third step surface 114-3. The radius R1 of the first step surface 114-1 is formed to be smaller than the radius R2 of the second step surface 114-2, and the radius R2 of the second step surface 114-2 is formed to be smaller than the radius R3 of the third step surface 114-3. The left end and the right end of the first step surface 114-1 are connected to the second step surface 114-2 by inclined surfaces 114a. The left end and the right end of the second step surface 114-2 are also connected to the third step surface 114-3 by inclined surfaces 114a. The inclination angle of the inclined surface 114a may be 90 degrees or more. By forming the step portions 114 in the tooth 113 of the stator 110 as described above, abrupt changes of the magnetic flux in the surface of the rotor 120 may be alleviated.

The rotor 120 is formed in a cylindrical shape and is disposed to be rotatable coaxially with the stator 110. The rotor 120 is disposed to be rotatable about the center of the stator 110 at a predetermined gap from the step portions 114 of the teeth 113 of the stator 110. For this purpose, a through hole 121 is formed at the center of the rotor 120, in which a rotation shaft (not illustrated) is disposed.

A plurality of permanent magnets 130 are provided inside the rotor 120 at regular intervals in the circumferential direction. In detail, the plurality of permanent magnets 130 are provided between the through hole 121 and the outer circumferential surface of the rotor 120. The plurality of permanent magnets 130 may be formed in a V shape, which is a magnetic flux concentration type, as illustrated in FIG. 11. For example, two bar-shaped magnets may be arranged in a V-shape.

Further, the plurality of permanent magnets 130 may be formed of ferrite or rare earth material. For example, the plurality of permanent magnets 130 may be formed of neodymium Nd.

The rotor 120 is formed of iron cores and a plurality of magnet insertion holes 123 in which the permanent magnets 130 are disposed are formed at equal intervals in the circumferential direction of the rotor 120. Each of the plurality of magnet insertion holes 123 is formed in a V shape corresponding to the shape of the permanent magnet 130.

The plurality of permanent magnets 130 provided in the rotor 120 all have the same polarity. When the plurality of permanent magnets 130 having the same polarity are inserted into magnet insertion holes 123 of the rotor 120, a portion 122 of the rotor 120, that is, a portion of the iron core, between the adjacent two permanent magnets 130 is magnetized in the opposite polarity to the polarity of the permanent magnets 130.

The number P of magnetic poles of the rotor 120 used in the interior permanent magnet motor 100 according to an embodiment of the disclosure as illustrated in FIG. 11 may satisfy the following formula.

$$P=2N$$

Here, N is a natural number and satisfies $2 \leq N \leq 8$.

Therefore, the number of the permanent magnets 130 provided in the rotor 120 is a half of the number P of magnetic poles of the rotor 120.

On the other hand, the number of magnetic poles of the rotor 120 may have a predetermined relationship with the number of the slots 115 of the stator 110. In the interior permanent magnet motor 100 as illustrated in FIG. 11, the ratio of the number of slots 115 of the stator 110 to the number of magnetic poles of the rotor 120 is 3:2. In other words, the number of slots 115 of the stator 110 is nine and the number of magnetic poles of the rotor 120 is six.

Flux barriers 125, 126, 127, and 128 may be provided on the left and right sides of each of the both ends of the permanent magnets 130 adjacent to the outer circumferential surface of the rotor 120, that is, a first end 131 and a second end 132. In other words, as illustrated in FIG. 11, the flux barriers 125, 126, 127, and 128 are provided on the left and right sides of one end of each of the plurality of permanent magnets 130 adjacent to the outer circumferential surface of the rotor 120.

The plurality of flux barriers 125, 126, 127, and 128 may be formed in a plurality of voids adjacent to the outer circumferential surface of the rotor 120 and provided at a predetermined interval in the circumferential direction of the rotor 120. In other words, each of the flux barriers 125, 126, 127, and 128 is formed along the outer circumferential surface of the rotor 120 with a predetermined width and length. Therefore, the flux barriers 125, 126, 127, and 128 are not opened toward the teeth 113 of the stator 110, and iron core portions 120a forming the outer circumferential surface of the rotor 120 are present between the flux barriers 125, 126, 127, and 128 and the teeth 113 of the stator 110.

The plurality of flux barriers 125, 126, 127, and 128 are in fluid communication with the plurality of magnet insertion holes 123 formed in the rotor 120. Because the plurality of flux barriers 125, 126, 127, and 128 all have the same structure, the two flux barriers 125, 126, 127, and 128 provided at both ends of the one magnet insertion hole 123 will be described in detail with reference to FIG. 11.

When the permanent magnet 130 is inserted into the magnet insertion hole 123, the ends 131 and 132 of the permanent magnet 130 are positioned in the flux barriers 125, 126, 127, and 128, respectively. Therefore, left flux barriers 125 and 127 and right flux barriers 126 and 128 may be positioned on the left and right sides of the ends 131 and 132 of the permanent magnet 130, respectively. In other words, the left flux barrier 125 and the right flux barrier 126 are provided on the left and right sides of the first end 131 of the permanent magnet 130. The left flux barrier 127 and the right flux barrier 128 are also provided on the left and right sides of the second end 132 of the permanent magnet 130. The left flux barriers 125 and 127 and the right flux barriers 126 and 128 all are in fluid communication with the magnet insertion hole 123.

Hereinafter, the dimensional relationship of the permanent magnet 130 and the flux barriers 125, 126, 127, and 128 used in the interior permanent magnet motor 100 according to an embodiment of the disclosure will be described with reference to FIG. 11. For reference, because the plurality of permanent magnets 130 and the corresponding plurality of flux barriers 125, 126, 127, and 128 are formed identically, hereinafter, the dimensional relationship of the permanent magnet 130 and the flux barriers 125, 126, 127, and 128 will be described on the basis of one permanent magnet 130 and two flux barriers 125, 126, 127, and 128 provided on the both ends of the permanent magnet 130.

The pole arc angle θm of the permanent magnet 130 may be formed to satisfy the following formula. Here, the pole arc angle θm refers to an angle between two straight lines connecting the center C of the rotor 120 and the opposite ends of the permanent magnet 130.

θn≤θm<θm+θs/2

θn=360/P

θs=360/S

Here, P is the number of magnetic poles of the rotor 120, and S is the number of slots 115 of the stator 110.

Therefore, when the pole arc angle θm of the permanent magnets 130 satisfies the above condition, the effective magnetic flux amount may be maximized.

Further, the pole arc angle θm of the permanent magnet 130, the flux barriers 125, 126, 127, and 128, and the slots 115 of the stator 110 may be formed to satisfy the following relationship.

θs/2≤θib<θm<θob

θs/2≤θib<θn

θn≤θm<θob

θm<θob<θm+θs

θn=360/P

θs=360/S

Here, θib is an inner flux barrier angle of the permanent magnets 130, θob is an outer flux barrier angle of the permanent magnet 130, P is the number of magnetic poles of the rotor 120, and S is the number of slots 115 of the stator 110.

The inner flux barrier angle θib of the permanent magnet 130 refers to an angle between two straight lines connecting the closest ends of the two flux barriers 126 and 127 provided at both ends of the permanent magnet 130 to the center C of the rotor 120. In other words, in FIG. 11, the inner flux barrier angle θib of the permanent magnet 130 refers to an angle between a first straight line L1 connecting the center C of the rotor 120 and the right end of the right flux barrier 126 provided at the first end 131 of the permanent magnet 130 and a second straight line L2 connecting the center C of the rotor 120 and the left end of the left flux bather 127 provided at the second end 132 of the permanent magnet 130.

The outer flux barrier angle θob of the permanent magnet 130 is an angle between two straight lines connecting the farthest ends of the two flux barriers 125 and 128 provided at both ends of the permanent magnet 130 to the center C of the rotor 120. In other words, in FIG. 11, the outer flux barrier angle θob of the permanent magnet 130 refers to an angle between a first straight line L3 connecting the center C of the rotor 120 and the left end of the left flux barrier 125 provided at the first end 131 of the permanent magnet 130 and a second straight line L4 connecting the center C of the rotor 120 and the right end of the right flux barrier 128 provided at the second end 132 of the permanent magnet 130.

When the flux barriers 125, 126, 127, and 128 satisfy the above conditions, the flux barriers 125, 126, 127, and 128 are positioned in the open slot 116 of the stator 110. In FIG. 11, the inner flux barriers 126 and 127 are positioned at the open slots 116 of the stator 110. Therefore, the flux barriers 125, 126, 127, and 128 may reduce the leakage magnetic flux so as to alleviate the abrupt change of the magnetic flux and make the voltage induced in the motor 100 sinusoidal.

The angle θcp of the consequent pole 122 formed between two adjacent permanent magnets 130 among the plurality of permanent magnets 130 of the rotor 120 may satisfy the following formula.

θib/2<θcp<θob

Here, the angle θcp of the consequent pole 122 refers to an angle between two straight lines connecting the nearest ends of the flux barriers 125 and 128 provided at one end of the adjacent two permanent magnets 130 to the center C of the rotor 120. For example, in FIG. 11, the consequent pole angle θcp refers to an angle between a first straight line L3 connecting the center C of the rotor 120 and the left end of the left flux barrier 125 provided at one end 131 of the first permanent magnet 130 and a second straight line L5 connecting the center C of the rotor 120 and the right end of the right flux barrier 128 provided at one end 132 of the second permanent magnet 130.

When the flux barriers 125, 126, 127, and 128 are provided at both ends of the permanent magnet 130 as described above, the waveform of the voltage induced in the motor 100 may become bilaterally symmetrical and the distortion rate (THD: total harmonic distortion) of the counter electromotive force and the torque ripple may be reduced.

Figure 13:
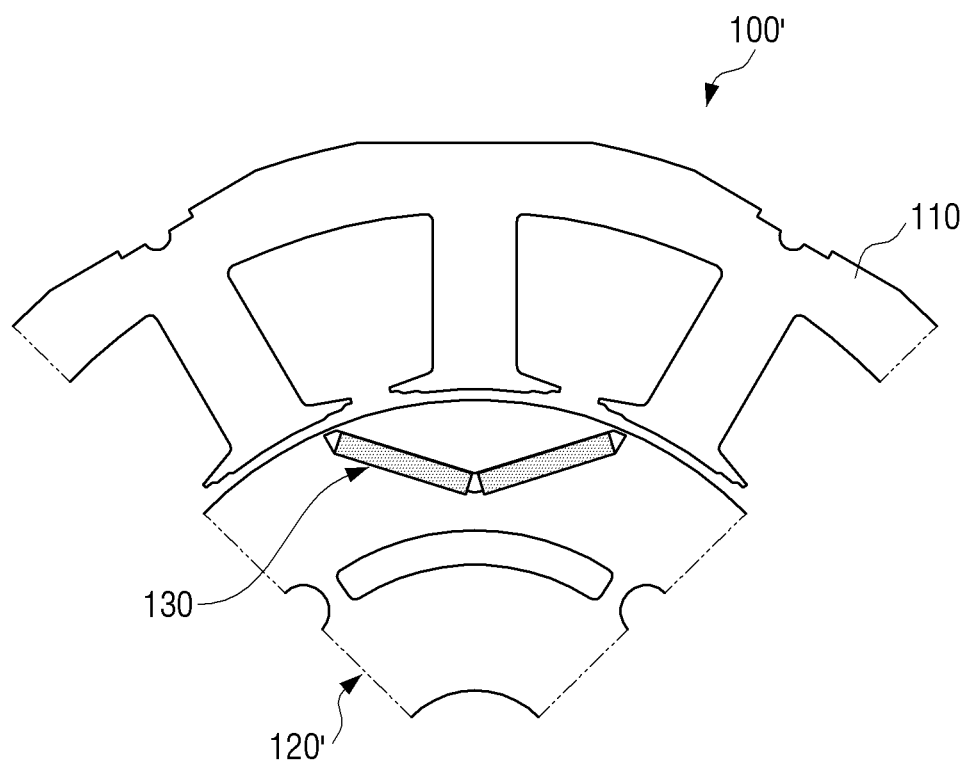
FIG. 13 is a partially enlarged cross-sectional view illustrating a case where a rotor of an interior permanent magnet motor according to an embodiment of the disclosure has no flux barrier.

FIG. 13 is a partially enlarged cross-sectional view illustrating a case where a rotor of an interior permanent magnet motor according to an embodiment of the disclosure has no flux barrier.

Referring to FIG. 13, there is no flux barrier at both ends of the permanent magnet 130 of the rotor 120' unlike FIG. 11. Graphs in which the waveform of the voltage induced in the motor, the torque ripple, and the distortion rate of the counter electromotive force of the interior permanent magnet motor 100 having flux barriers 125, 126, 127, and 128 at both ends of the permanent magnets 130 as illustrated in FIG. 11 are compared with those of the interior permanent magnet motor 100' having no flux barrier at both ends of the permanent magnets 130 as illustrated in FIG. 13 are illustrated in FIGS. 14, 15, and 16.

Figure 14:
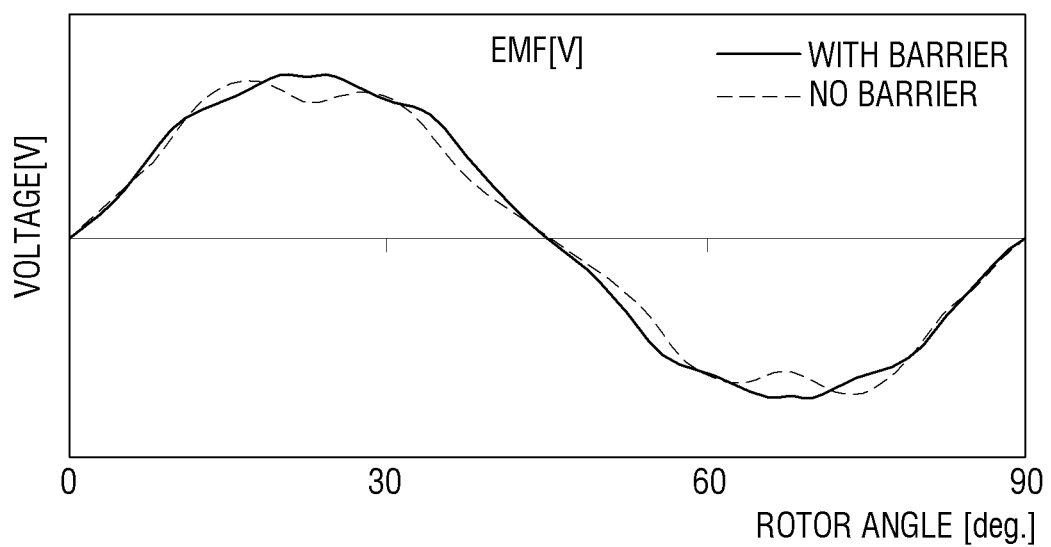
FIG. 14 is a graph illustrating the waveform of voltage induced in an interior permanent magnet motor according to an embodiment of the disclosure when a rotor of the motor has flux barriers and when the rotor of the motor has no flux barrier.

FIG. 14 is a graph illustrating the waveform of voltage induced in an interior permanent magnet motor according to an embodiment of the disclosure when a rotor of the motor has flux barriers and when the rotor of the motor has no flux barrier. In FIG. 14, the horizontal axis represents the rotor angle (degrees), and the vertical axis represents the voltage (V).

Referring to FIG. 14, in the case of the interior permanent magnet motor 100 having the rotor 120 provided with the flux barriers 125, 126, 127, and 128, the waveform of the voltage induced in the motor 100 is sinusoidal and bilaterally symmetrical. However, in the case of the interior permanent magnet motor 100' having the rotor 120' having no flux barrier, the waveform of the voltage induced in the motor 100' is not bilaterally symmetrical.

Figure 15:
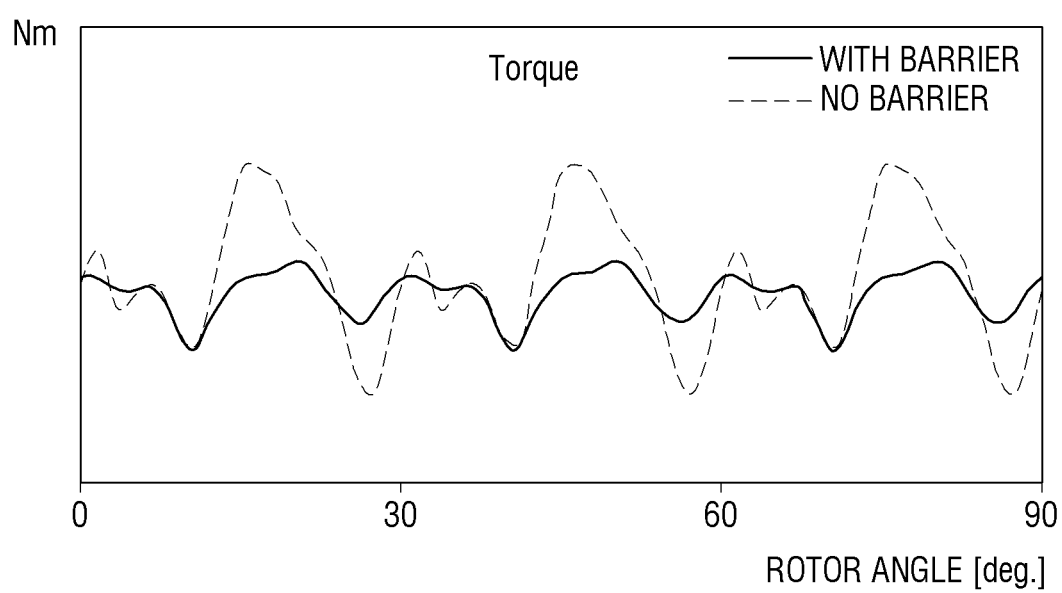
FIG. 15 is a graph illustrating the torque ripple of an interior permanent magnet motor according to an embodiment of the disclosure when a rotor of the motor has flux barriers and when the rotor of the motor has no flux barrier.
Figure 16:
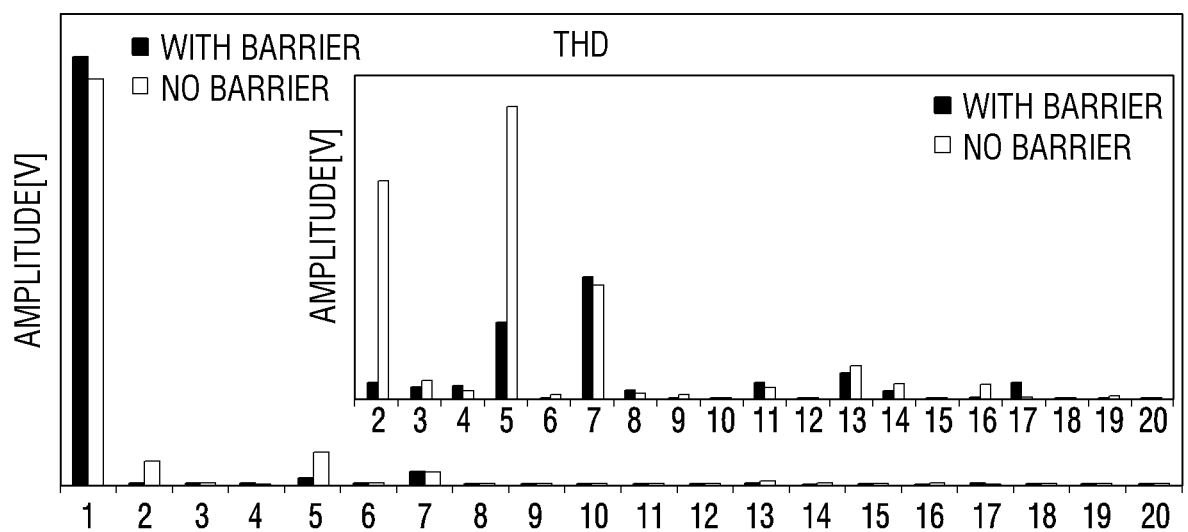
FIG. 16 is a graph illustrating the distortion rate of the counter electromotive force of an interior permanent magnet motor according to an embodiment of the disclosure when a rotor of the motor has flux barriers and when the rotor of the motor has no flux barrier.

FIG. 15 is a graph illustrating the torque ripple of an interior permanent magnet motor according to an embodiment of the disclosure when a rotor of the motor has flux barriers and when the rotor of the motor has no flux barrier. In FIG. 15, the horizontal axis represents the rotor angle (degrees), and the vertical axis represents the torque (Nm).

Referring to FIG. 15, in the case of the interior permanent magnet motor 100 having the rotor 120 provided with the flux barriers 125, 126, 127, and 128, the waveform of the voltage induced in the motor 100 is bilaterally symmetrical so that the torque ripple is small. However, in the case of the interior permanent magnet motor 100' having the rotor 120' having no flux barrier, the waveform of the voltage induced in the motor 100' is not bilaterally symmetrical so that the torque ripple is large.

FIG. 16 is a graph illustrating the distortion rate of the counter electromotive force of an interior permanent magnet motor according to an embodiment of the disclosure when a rotor of the motor has flux barriers and when the rotor of the motor has no flux barrier. In FIG. 16, the horizontal axis represents the order, and the vertical axis represents the amplitude (V). Further, the inner graph of FIG. 16 is an enlarged view of amplitudes corresponding to the orders 2 to 20 of the outer graph.

Referring to FIG. 16, in the case of the interior permanent magnet motor 100 having the rotor 120 provided with the flux barriers 125, 126, 127, and 128, the waveform of the voltage induced in the motor 100 is substantially bilaterally symmetrical so that the distortion rate of the counter electromotive force is small. However, in the case of the interior permanent magnet motor 100' having the rotor 120' having no flux barrier, the waveform of the voltage induced in the motor 100' is not bilaterally symmetrical so that the distortion rate of the counter electromotive force is large.

Referring again to FIG. 11, a plurality of inner flux barriers 129 may be provided between the through hole 121 in which the rotation shaft of the rotor 120 is disposed and the plurality of permanent magnets 130. The inner flux barriers 129 are spaced apart by a predetermined distance from the outer circumferential surface of the through hole 121 and are formed to have a predetermined width and length along the outer circumferential surface of the through hole 121. The plurality of inner flux barriers 129 may prevent the magnetic flux from leaking into the rotor 20, thereby increasing the magnetic flux interlinked with the coils of the stator 110.

Figure 17:
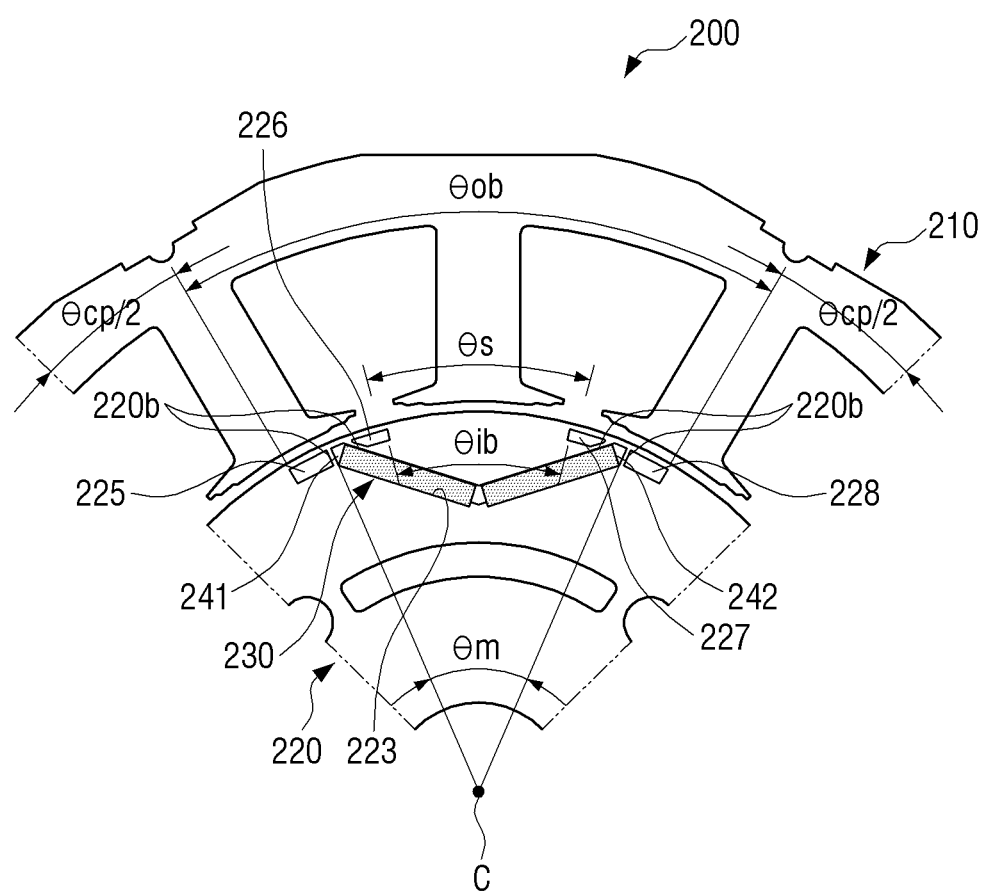
FIG. 17 is a partially enlarged cross-sectional view illustrating an interior permanent magnet motor according to an embodiment of the disclosure.

FIG. 17 is a partially enlarged cross-sectional view illustrating an interior permanent magnet motor according to an embodiment of the disclosure.

Referring to FIG. 17, an interior permanent magnet motor 200 according to an embodiment of the disclosure may include a stator 210 and a rotor 220.

The stator 210 is the same as the stator 110 of the interior permanent magnet motor 100 according to the embodiment of FIG. 11, and thus detailed description thereof is omitted.

The rotor 220 is formed similarly to the rotor 120 of the interior permanent magnet motor 100 according to the above-described embodiment of FIG. 11. The plurality of permanent magnets 230 inserted into the rotor 220 are formed in the same V-shape as the plurality of permanent magnets 130 of the embodiment of FIG. 11.

However, the flux barriers provided at both ends of the permanent magnets 230 of the rotor 220 are different.

Referring to FIG. 17, each of the flux barriers provided at both ends of the permanent magnet 230 are partitioned into three regions by partition walls 220b.

In detail, the flux barrier provided at one end of the permanent magnet 230 includes a middle flux barrier 241 communicating with the magnet insertion hole 223, a left flux barrier 225 provided at the left side of the middle flux barrier 241, and a right flux barrier 226 provided at the right side of the middle flux barrier 241. Between the middle flux barrier 241 and the left flux barrier 225, a partition wall 220b formed of an iron core forming the rotor 220 is interposed. Further, between the middle flux barrier 241 and the right flux barrier 226, the partition wall 220b formed of the iron core forming the rotor 220 is interposed. Thus, the left flux barrier 225 and the right flux barrier 226 are spaced apart from the middle flux barrier 241 by a predetermined distance.

The flux barrier provided at the other end of the permanent magnet 230 also includes a middle flux barrier 242 communicating with the magnet insertion hole 223, a left flux barrier 227 provided at the left side of the middle flux barrier 242, and a right flux barrier 228 provided at the right side of the middle flux barrier 242. A partition wall 220b is interposed between the middle flux barrier 242 and the left flux barrier 227. The partition wall 220b is also interposed between the middle flux barrier 242 and the right flux barrier 228. Thus, the left flux barrier 227 and the right flux barrier 228 are spaced apart from the middle flux barrier 242 by a predetermined distance.

Therefore, in the interior permanent magnet motor 200 as illustrated in FIG. 17, the left flux barriers 225 and 227 and the right flux barriers 226 and 228 are not in fluid communication with the magnet insertion hole 223.

Figure 18:
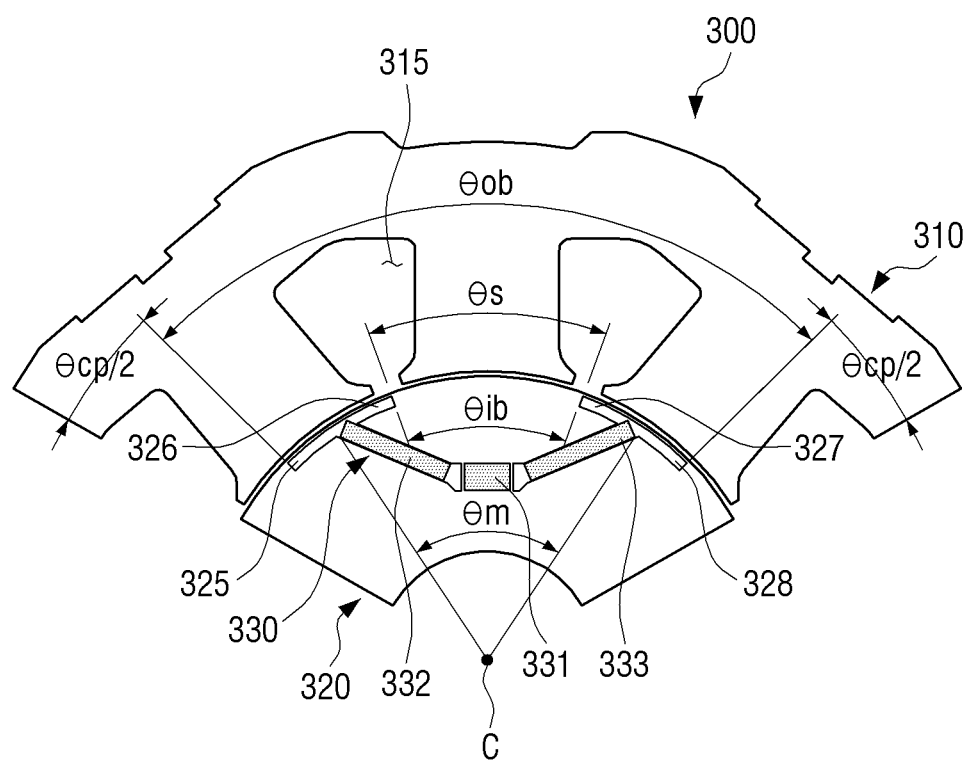
FIG. 18 is a partially enlarged cross-sectional view illustrating an interior permanent magnet motor according to an embodiment of the disclosure.

FIG. 18 is a partially enlarged cross-sectional view illustrating an interior permanent magnet motor according to an embodiment of the disclosure.

Referring to FIG. 18, an interior permanent magnet motor 300 according to an embodiment of the disclosure may include a stator 310 and a rotor 320.

The stator 310 may be formed to be the same as or similar to the stator 10 of the interior permanent magnet motor 1 according to the above-described embodiment, and thus a detailed description thereof is omitted.

The rotor 320 is formed similarly to the rotor 20 of the interior permanent magnet motor 1 according to the above-described embodiment. However, it is different in that the shape of the permanent magnet 330 is substantially U-shaped. As an example, the permanent magnet 330 may be formed by disposing three bar-shaped magnets 331, 332, and 333 in a substantially U-shape. In other words, the two bar-shaped magnets 332 and 333 may be disposed to be inclined to the left and right sides of the center permanent magnet 331. To this end, the magnet insertion holes 323 provided in the rotor 320 are also formed in a substantially U-shape corresponding to the permanent magnets 330.

Flux barriers 325, 326, 327, and 328 provided at the left and right sides of both ends of the permanent magnet 330 are the same as the above-described embodiment. Thus, a detailed description thereof is omitted.

Further, the pole arc angle θm of the permanent magnet 330, the flux barriers 325, 326, 327, and 328, and the slots 315 of the stator 310 may be formed to satisfy the following relationship.

$\theta n \leq \theta m < \theta m + \theta s/2$ $\theta s/2 \leq \theta ib < \theta m < \theta ob$ $\theta s/2 \leq \theta ib < \theta n$ $\theta n \leq \theta m < \theta ob$ $\theta m < \theta ob < \theta m + \theta s$ $\theta n = 360/P$ $\theta s = 360/S$ Here, θib is an inner flux barrier angle of the permanent magnets 330, θob is an outer flux barrier angle of the permanent magnet 330, P is the number of magnetic poles of the rotor 320, and S is the number of slots 315 of the stator 310.

Figure 19:
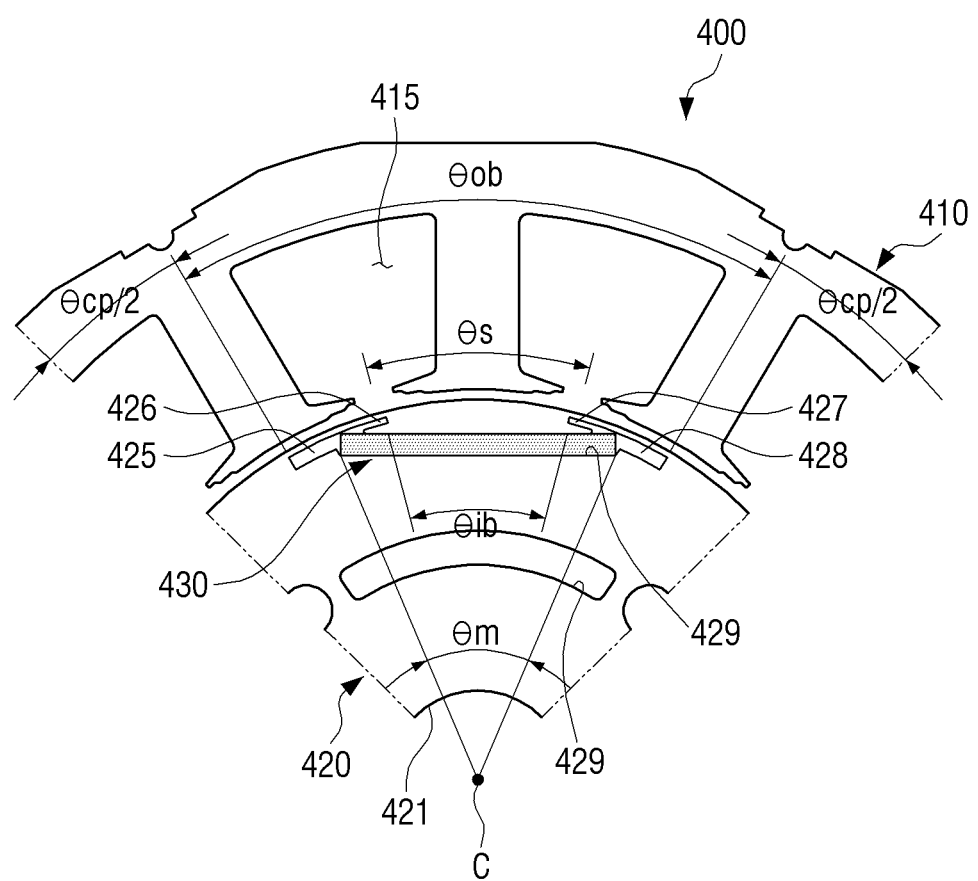
FIG. 19 is a partially enlarged cross-sectional view illustrating an interior permanent magnet motor according to an embodiment of the disclosure.

FIG. 19 is a partially enlarged cross-sectional view illustrating an interior permanent magnet motor according to an embodiment of the disclosure.

Referring to FIG. 19, an interior permanent magnet motor 400 according to an embodiment of the disclosure may include a stator 410 and a rotor 420.

The stator 410 may be formed to be the same as or similar to the stator 10 of the interior permanent magnet motor 1 according to the above-described embodiment, and thus a detailed description thereof is omitted.

The rotor 420 is formed similarly to the rotor 20 of the interior permanent magnet motor 1 according to the above-described embodiment. However, it is different in that the shape of the permanent magnet 430 is a bar shape, that is, a rod shape. Therefore, the magnet insertion holes 423 provided in the rotor 420 are formed in a bar shape corresponding to the permanent magnets 430.

Flux barriers 425, 426, 427, and 428 provided at the left and right sides of both ends of the permanent magnet 430 are the same as the above-described embodiment. Therefore, a detailed description thereof is omitted.

A plurality of inner flux barriers 429 provided between the through hole 421 in which the rotation shaft is disposed and the plurality of permanent magnets 430 in the rotor 420 are the same as the above-described embodiment. Therefore, a detailed description thereof is omitted.

Further, the pole arc angle θm of the permanent magnet 430, the flux barriers 425, 426, 427, and 428, and the slots 415 of the stator 410 may be formed to satisfy the following relationship as in the case of the interior permanent magnet motor 1 according to the above-described embodiment.

$\theta n \leq \theta m < \theta m + \theta s/2$ $\theta s/2 \leq \theta ib < \theta m < \theta ob$ $\theta s/2 \leq \theta ib < \theta n$ $\theta n < \theta m < \theta ob$ $\theta m < \theta ob < \theta m + \theta s$ $\theta n = 360/P$ $\theta s = 360/S$ Here, θib is an inner flux barrier angle of the permanent magnets 430, θob is an outer flux barrier angle of the permanent magnet 430, P is the number of magnetic poles of the rotor 420, and S is the number of slots 415 of the stator 410.

Figure 20:
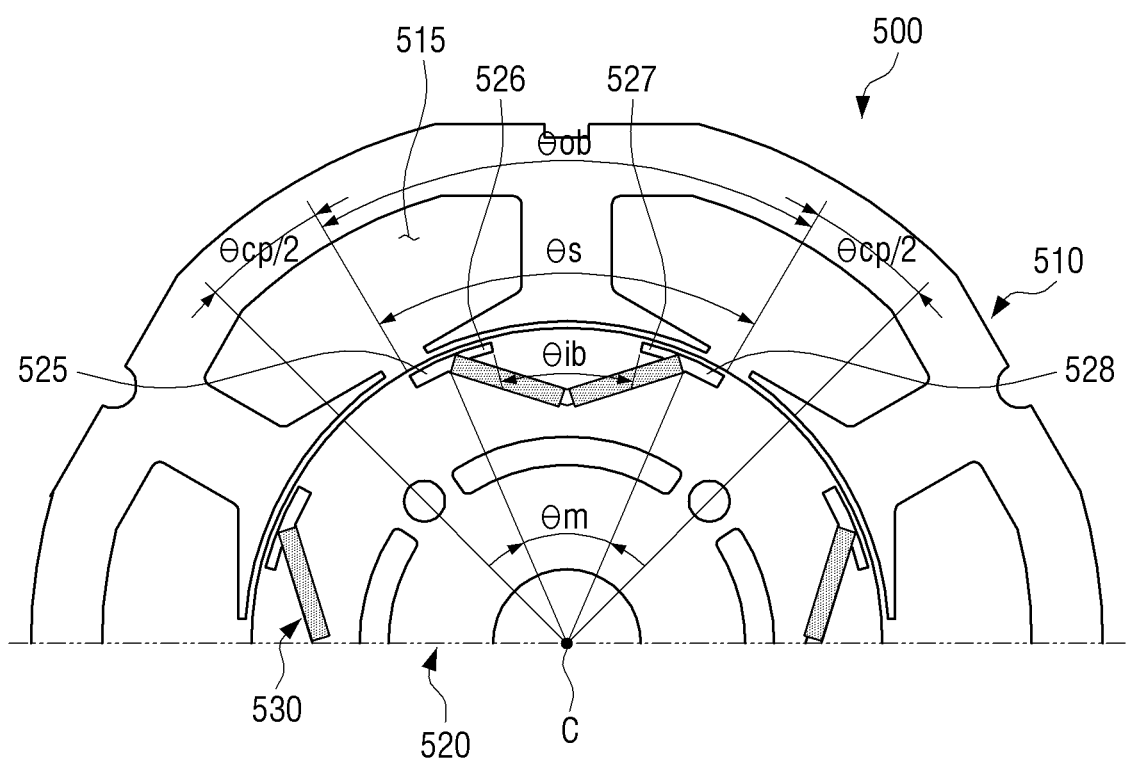
FIG. 20 is a partially enlarged cross-sectional view illustrating an interior permanent magnet motor according to an embodiment of the disclosure.

FIG. 20 is a partially enlarged cross-sectional view illustrating an interior permanent magnet motor according to an embodiment of the disclosure.

Referring to FIG. 20, an interior permanent magnet motor 500 according to an embodiment of the disclosure may include a stator 510 and a rotor 520.

The stator 510 is formed similarly to the stator 110 of the interior permanent magnet motor 100 according to the embodiment of FIG. 11.

The rotor 520 is formed similarly to the rotor 120 of the interior permanent magnet motor 100 according to the embodiment of FIG. 11. A plurality of permanent magnets 530 inserted into the rotor 520 are V-shaped like the permanent magnets 130 of the embodiment of FIG. 11.

However, the interior permanent magnet motor 500 as illustrated in FIG. 20 differs from the interior permanent magnet motor 100 of FIG. 11 in the ratio of the number of slots 515 of the stator 510 to the number of magnetic poles of the rotor 520.

The interior permanent magnet motor 500 illustrated in FIG. 20 has the ratio of the number of slots 515 of the stator 510 to the number of magnetic poles of the rotor 520 of 3:4. In detail, the stator 510 has six slots 515, and the rotor 520 has eight magnetic poles.

Further, the interior permanent magnet motor 500 illustrated in FIG. 20 may be configured such that the pole arc angle θm of the permanent magnet 530, the flux barriers 525, 526, 527, and 528, and the slots 515 of the stator 510 satisfy the following formulas as in the case of the interior permanent magnet motor 100 according to the above-described embodiment.

$$\theta n \leq \theta m < \theta m + \theta s/2$$

$$\theta s/2 \leq \theta ib < \theta m < \theta ob$$

$$\theta s/2 \leq \theta ib < \theta n$$

$$\theta n \leq \theta m < \theta ob$$

$$\theta m < \theta ob < \theta m + \theta s$$

$$\theta n = 360/P$$

$$\theta s = 360/S$$

Here, θib is an inner flux barrier angle of the permanent magnets 530, θob is an outer flux barrier angle of the permanent magnet 530, P is the number of magnetic poles of the rotor 520, and S is the number of slots 515 of the stator 510.

Hereinafter, test result comparing the characteristics of the interior permanent magnet motor according to an embodiment of the disclosure and the conventional interior permanent magnet motor will be described.

Figure 21:
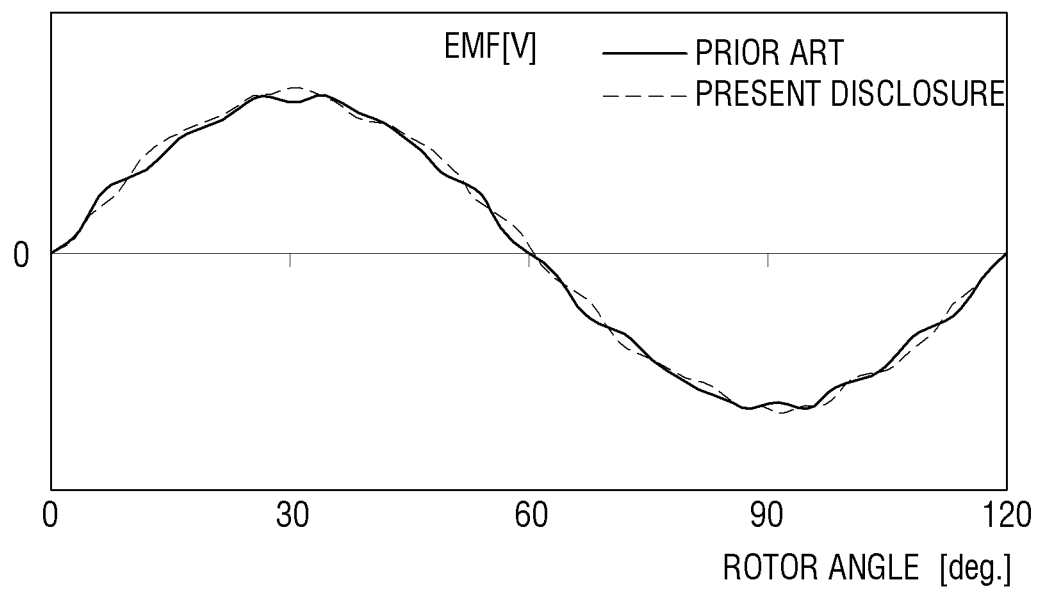
FIG. 21 is a graph illustrating the waveform of voltage induced in each of a conventional interior permanent magnet motor and an interior permanent magnet motor according to an embodiment of the disclosure.

FIG. 21 is a graph illustrating the waveform of voltage induced in a conventional interior permanent magnet motor and an interior permanent magnet motor according to an embodiment of the disclosure. In FIG. 21, the horizontal axis represents the rotor angle (degrees), and the vertical axis represents the electromotive force (V).

Referring to FIG. 21, the waveform of the induced voltage of the interior permanent magnet motor according to an embodiment of the disclosure having only permanent magnets of the same polarity is almost the same as the waveform of the induced voltage of the conventional interior permanent magnet motor having twice the permanent magnets as the interior permanent magnet motor according to an embodiment of the disclosure.

Figure 22:
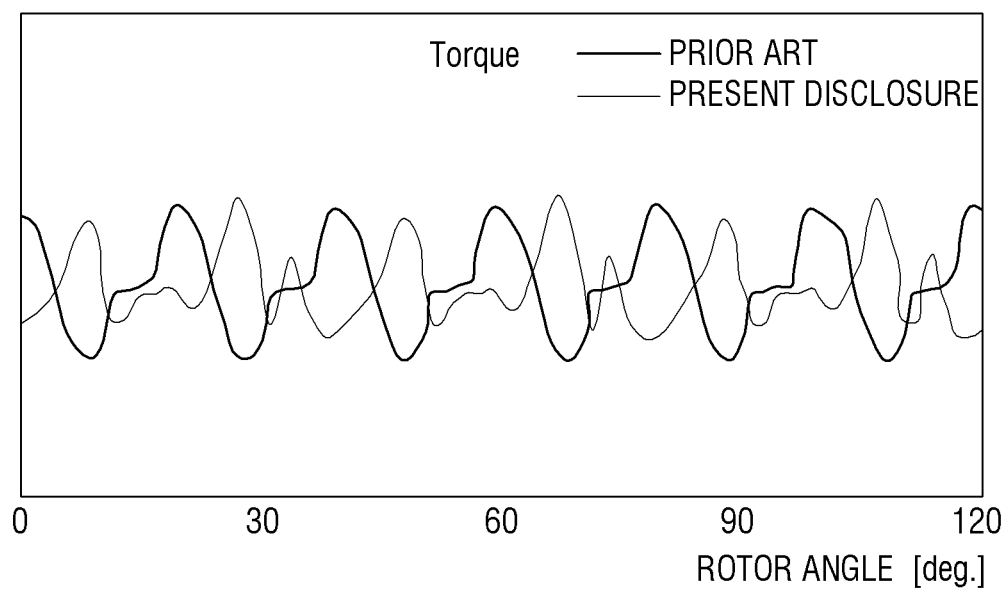
FIG. 22 is a graph illustrating the torque ripple of each of a conventional interior permanent magnet motor and an interior permanent magnet motor according to an embodiment of the disclosure.

FIG. 22 is a graph illustrating the torque ripple of a conventional interior permanent magnet motor and an interior permanent magnet motor according to an embodiment of the disclosure. In FIG. 22, the horizontal axis represents the rotor angle (degrees), and the vertical axis represents the torque (Nm).

Referring to FIG. 22, the size of the torque ripple of the interior permanent magnet motor according to an embodiment of the disclosure having only permanent magnets of the same polarity is almost the same as the size of the torque ripple of the conventional interior permanent magnet motor having twice the permanent magnets as the interior permanent magnet motor according to an embodiment of the disclosure.

Figure 23:
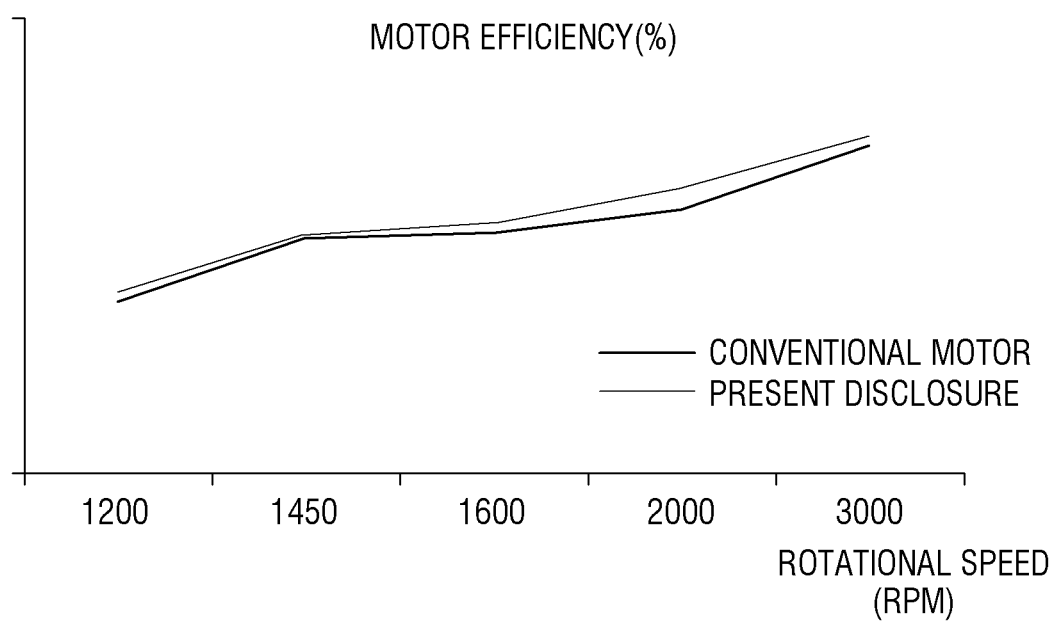
FIG. 23 is a graph illustrating the motor efficiency of each of a conventional interior permanent magnet motor and an interior permanent magnet motor according to an embodiment of the disclosure.

FIG. 23 is a graph illustrating motor efficiencies of a conventional interior permanent magnet motor and an interior permanent magnet motor according to an embodiment of the disclosure. In FIG. 23, the horizontal axis represents the rotational speed (rpm) of the motor, and the vertical axis represents the efficiency (%).

Referring to FIG. 23, the efficiency of the interior permanent magnet motor according to an embodiment of the disclosure having only permanent magnets of the same polarity is equal to or better than the efficiency of the conventional interior permanent magnet motor having twice the permanent magnets as the interior permanent magnet motor according to an embodiment of the disclosure.

Figure 24:
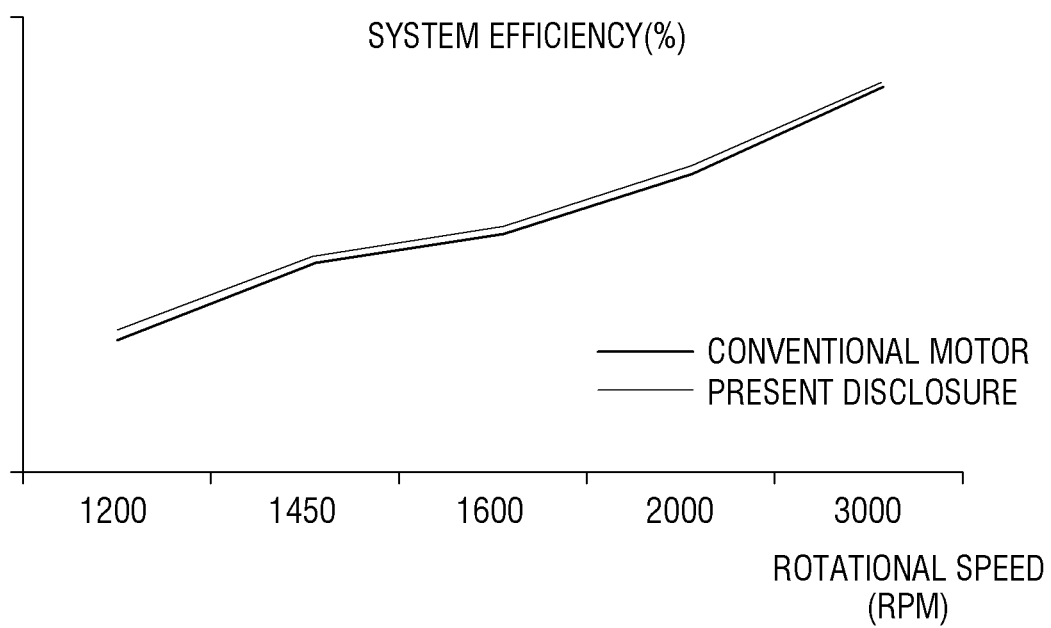
FIG. 24 is a graph illustrating the system efficiency of each of a conventional interior permanent magnet motor and an interior permanent magnet motor according to an embodiment of the disclosure.

FIG. 24 is a graph illustrating system efficiencies of a conventional interior permanent magnet motor and an interior permanent magnet motor according to an embodiment of the disclosure. Here, the system efficiency refers to the efficiency of the system including the interior permanent magnet motor and a controller configured to control the interior permanent magnet motor. In FIG. 24, the horizontal axis represents the rotational speed (rpm) of the motor, and the vertical axis represents the efficiency (%).

Referring to FIG. 24, the system efficiency of the interior permanent magnet motor according to an embodiment of the disclosure having only permanent magnets of the same polarity is almost the same as the system efficiency of the conventional interior permanent magnet motor having twice the permanent magnets as the interior permanent magnet motor according to an embodiment of the disclosure.

The interior permanent magnet motor according to an embodiment of the disclosure having the above-described structure may be used in a compressor.

Figure 25:
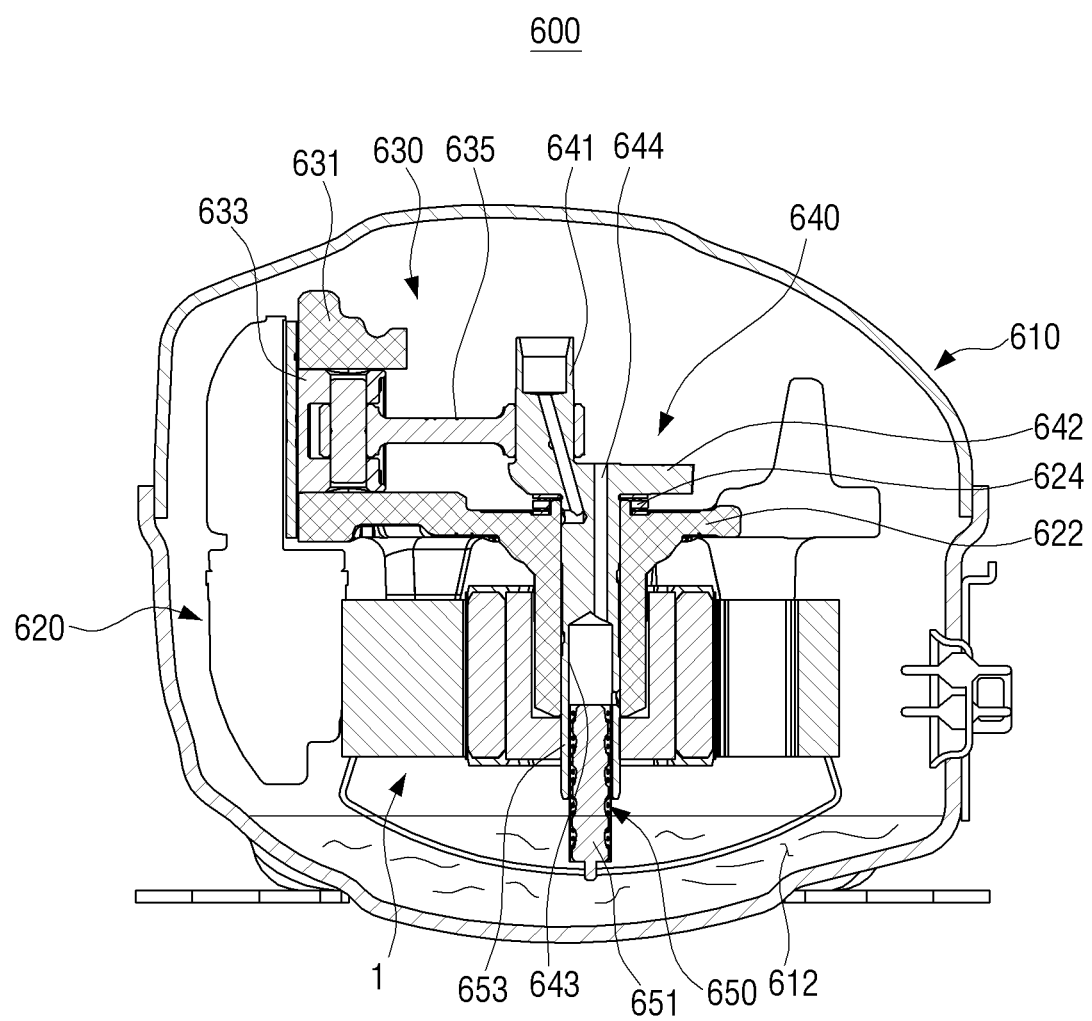
FIG. 25 is a cross-sectional view illustrating a compressor using an interior permanent magnet motor according to an embodiment of the disclosure.

FIG. 25 is a cross-sectional view illustrating a reciprocating compressor using an interior permanent magnet motor according to an embodiment of the disclosure.

Referring to FIG. 25, a reciprocating compressor 600 may include a casing 610, a frame 620, a compression mechanism 630, a drive motor 1, a rotation shaft 640, and an oil supplier 650.

The casing 610 forms an outer appearance of the reciprocating compressor 600. The frame 620, the compression mechanism 630, the drive motor 1, the rotation shaft 640, and the oil supplier 650 are disposed inside the casing 610. The casing 610 is provided with an inlet and an outlet for a refrigerant to flow in and out. Further, an oil reservoir 612 in which oil or lubricant (hereinafter referred to as oil) for lubrication and cooling of various components of the compressor 600 is stored may be provided in a lower portion of the casing 610.

The frame 620 is fixed to the inside of the casing 610 and fixes or supports various components inside the casing 610.

The compression mechanism 630 is provided in an upper portion of the frame 620 and is configured to compress the refrigerant. The compression mechanism 630 includes a cylinder 631, which forms a compression space of the refrigerant and is fixed to the frame 620, and a piston 633 linearly reciprocating inside the cylinder 631 and compressing the refrigerant. The refrigerant compressed in the compression mechanism 630 is discharged to the outside of the casing 610 through the outlet.

The drive motor 1 reciprocates the piston 633 of the compression mechanism 630 and uses the interior permanent magnet motor 1 according to an embodiment of the disclosure as described above. Therefore, a detailed description of the interior permanent magnet motor 1 is omitted.

The rotation shaft 640 is provided to transmit the rotational force of the interior permanent magnet motor 1 to the compression mechanism 630. In other words, the rotation shaft 640 is coupled to the rotor 20 of the interior permanent magnet motor 1 and rotates together with the rotor 20 to operate the compression mechanism 630. The rotation shaft 640 is rotatably supported by a shaft supporter 622 fixed to the frame 620.

The rotation shaft 640 may include an eccentric portion 641 provided at an upper portion of the rotation shaft 640 and a cavity 643 provided at a lower portion thereof.

The eccentric portion 641 is eccentric with respect to the rotational center axis of the rotation shaft 640. The eccentric portion 641 is connected to the piston 633 of the compression mechanism 630 by a connecting rod 635.

Therefore, when the rotation shaft 640 rotates, the piston 633 may performs a linear reciprocating motion with respect to the cylinder 631. In other words, the rotational motion of the rotation shaft 640 may be converted into the linear reciprocating motion of the piston 633 by the eccentric portion 641 of the rotation shaft 640 and the connecting rod 635.

A disc portion 642 extending in the radial direction may be provided below the eccentric portion 641. A bearing 624 that supports the rotation of the rotation shaft 640 and the axial load of the rotation shaft 640 may be provided between the disc portion 642 and the shaft supporter 622.

The rotation shaft 640 is provided with an oil passage 644 configured to communicate the cavity 643 with the top surface of the disc portion 642. Therefore, the oil supplied through the cavity 643 is discharged to the upper portion of the rotation shaft 640 through the oil passage 644.

The oil supplier 650 is disposed in the cavity 643 provided at the lower portion of the rotation shaft 640 and is formed to raise the oil stored in the oil reservoir 612 of the casing 610. The oil supplier 650 includes an oil raising member 653 disposed in the cavity 643 of the rotation shaft 640 and a fixed shaft 651 disposed to be inserted into the oil raising member 653 and immersed in the oil of the oil reservoir 612.

Therefore, when the rotation shaft 640 rotates, the oil of the oil reservoir 612 is supplied to the upper portion of the rotation shaft 640 through the oil passage 644 of the rotation shaft 640 by the oil supplier 650.

The oil supplied by the oil supplier 650 lubricates and cools the cylinder 631, the piston 633, the connecting rod 635, and the bearing 624 of the compression mechanism 630.

Figure 26:
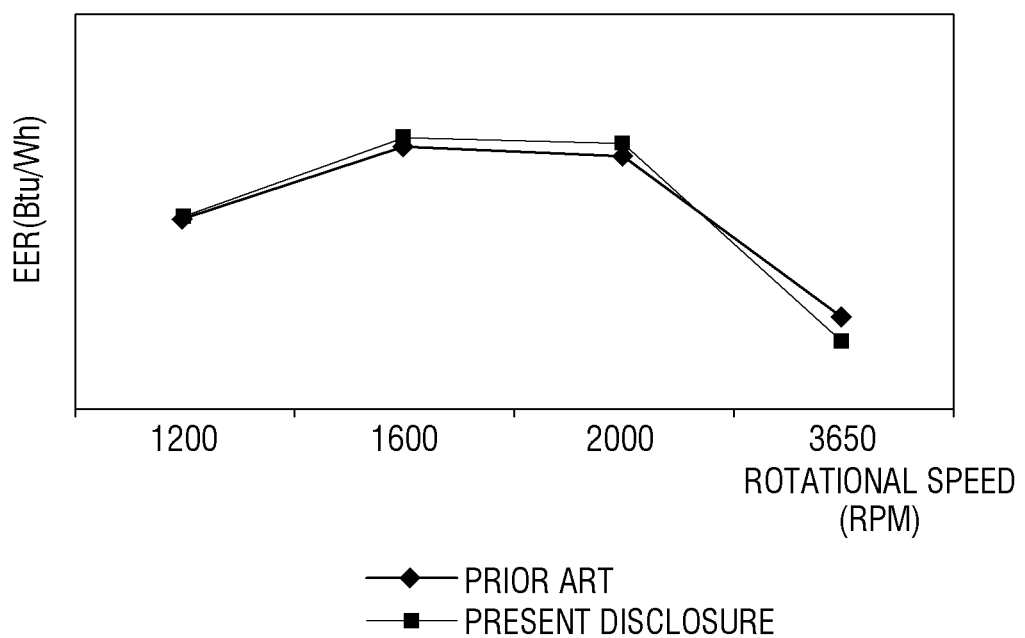
FIG. 26 is a graph illustrating the cooling capacity of each of a compressor using a conventional interior permanent magnet motor and a compressor using an interior permanent magnet motor according to an embodiment of the disclosure.

FIG. 26 is a graph illustrating cooling capacities of a compressor using a conventional interior permanent magnet motor and a compressor using an interior permanent magnet motor according to an embodiment of the disclosure. In FIG. 26, the horizontal axis represents the rotational speed (rpm) of the motor, and the vertical axis represents the cooling capacity (Btu/Wh).

Referring to FIG. 26, it may be seen that the cooling capacity of the compressor using the interior permanent magnet motor according to an embodiment of the disclosure is substantially equivalent to that of the compressor using a conventional interior permanent magnet motor.

Figure 27:
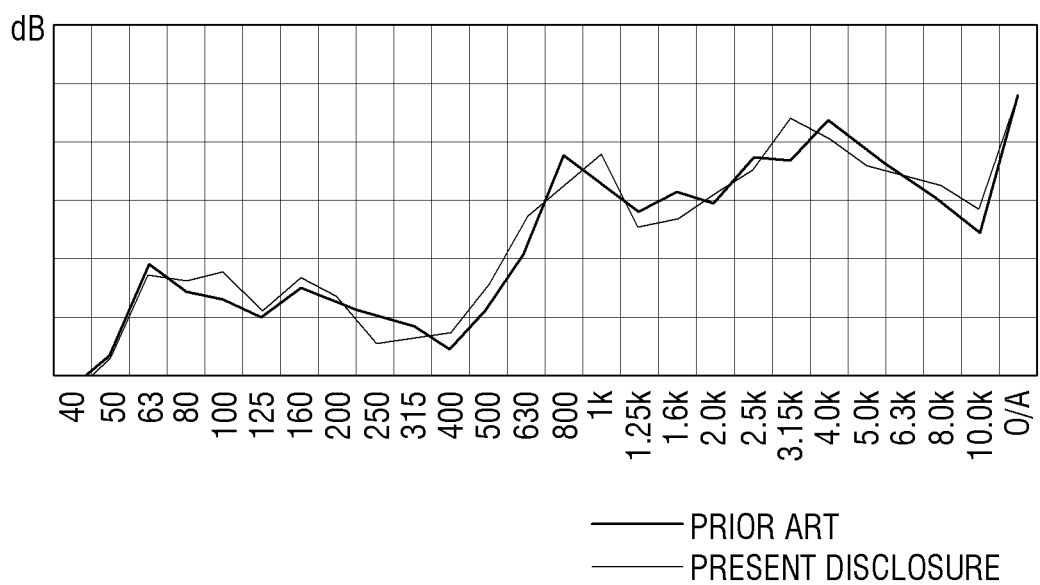
FIG. 27 is a graph illustrating noise of each of a compressor using a conventional interior permanent magnet motor and a compressor using an interior permanent magnet motor according to an embodiment of the disclosure.

FIG. 27 is a graph illustrating noise of a compressor using a conventional interior permanent magnet motor and a compressor using an interior permanent magnet motor according to an embodiment of the disclosure. In FIG. 27, the horizontal axis represents frequency (Hz), and the vertical axis represents noise (dB).

Referring to FIG. 27, it may be seen that the noise of the compressor using the interior permanent magnet motor according to an embodiment of the disclosure is substantially the same as the noise of the compressor using the conventional interior permanent magnet motor.

A refrigeration cycle apparatus may be constructed by using the compressor to which the interior permanent magnet motor according to an embodiment of the disclosure as described above is applied. The refrigeration cycle apparatus is an apparatus configured to lower the ambient temperature by circulating refrigerant, and may include a compressor, a condenser, an expansion valve, and an evaporator.

With the interior permanent magnet motor according to an embodiment of the disclosure having the structure as described above, because the pole arc angle of the permanent magnet is larger than the pole arc angle of the conventional interior permanent magnet motor, the effective magnetic flux amount may be maximized even when the number of permanent magnets is halved compared with the conventional interior permanent magnet motor.

Further, the interior permanent magnet motor according to an embodiment of the disclosure includes flux barriers disposed on the left and right sides of one end of the permanent magnet to reduce the leakage magnetic flux and alleviate abrupt change in the magnetic flux flowing from the rotor to the stator, so that the waveform of the voltage induced in the motor is sinusoidal. Therefore, the distortion rate of the counter electromotive force and the torque ripple of the interior permanent magnet motor according to an embodiment of the disclosure may be almost the same as those of the conventional interior permanent magnet motor.

Therefore, with the interior permanent magnet motor according to an embodiment of the disclosure, the number of permanent magnets may be reduced to half and the performance equivalent to that of the conventional interior permanent magnet motor may be achieved.

While the embodiments of the present disclosure have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the inventive concepts.

What is claimed is:

1. An interior permanent magnet motor comprising:
   a stator having a plurality of slots;
   a rotor rotatably disposed inside the stator;
   a plurality of permanent magnets having a same polarity and disposed at intervals in a circumferential direction in the rotor; and
   a plurality of flux barriers including a first pair of flux barriers provided on a first end of each of the plurality of permanent magnets and a second pair of flux barriers provided on a second end of each of the plurality of permanent magnets, the plurality of flux barriers being adjacent to an outer circumferential surface of the rotor,
   wherein the rotor has a number of magnetic poles including the plurality of permanent magnets, and a ratio of a number of the plurality of slots of the stator to the number of magnetic poles of the rotor is 3:2 or 3:4, and
   wherein a number of the plurality of permanent magnets is ½ of the number of magnetic poles of the rotor.

2. The interior permanent magnet motor of claim 1, wherein
   a pole arc angle θm of each of the plurality of permanent magnets satisfies following formulas:

$\theta_n \le \theta_m < \theta_m + \theta_s/2$ $\theta n = 360/P$ $\theta s = 360/S$ where P is the number of magnetic poles of the rotor, and S is the number of slots of the stator.

3. The interior permanent magnet motor of claim 1, wherein
   a pole arc angle θm of each of the plurality of permanent magnets and the plurality of flux barriers satisfy following formulas:

$\theta_s/2 \le \theta_{ib} < \theta_n$ $\theta_n \le \theta_m < \theta_{ob}$ $$\theta m < \theta ob < \theta m + \theta s$$

$$\theta n = 360/P$$

$$\theta s = 360/S$$

where $\theta ib$ is an inner flux barrier angle of the permanent magnet, $\theta ob$ is an outer flux barrier angle of the permanent magnet, P is the number of magnetic poles of the rotor, and S is the number of slots of the stator.

4. The interior permanent magnet motor of claim 3, wherein an angle $\theta cp$ of a consequent pole which is one of the magnetic poles of the rotor, is formed between two adjacent permanent magnets among the plurality of permanent magnets, satisfies a following formula:

$$\theta ib/2 < \theta cp < \theta ob.$$

5. The interior permanent magnet motor of claim 1, wherein the number of magnetic poles of the rotor satisfies a following formula:

$$P = 2N$$

where N is a natural number and $2 \leq N \leq 8$.

6. The interior permanent magnet motor of claim 1, wherein the rotor has a cylindrical shape, and the plurality of flux barriers are a plurality of voids adjacent to the outer circumferential surface of the rotor and at predetermined intervals in the circumferential direction of the rotor.

7. The interior permanent magnet motor of claim 1, wherein the rotor includes a plurality of magnet insertion holes in which the plurality of permanent magnets are disposed, the first pair of flux barriers and the second pair of flux barriers of the plurality of flux barriers are provided on left and right sides of both ends of each of the plurality of magnet insertion holes, and the magnet insertion hole is in fluid communication with the corresponding left flux barrier and the right flux barrier.

8. The interior permanent magnet motor of claim 7, further comprising a partition wall between the magnet insertion hole and the corresponding left flux barrier and the right flux barrier.

9. The interior permanent magnet motor of claim 1, wherein the stator includes a plurality of teeth protruding from an inner circumferential surface of a cylindrical yoke toward a center of the stator, and the stator is a concentric winding type stator in which coils are wound on each of the plurality of teeth.

10. The interior permanent magnet motor of claim 9, wherein each of the plurality of teeth is provided with a step portion including at least one step surface facing the rotor.

11. The interior permanent magnet motor of claim 1, wherein a rotation shaft is disposed at a center of the rotor, and a plurality of inner flux barriers are formed between the rotation shaft and the plurality of permanent magnets.

12. The interior permanent magnet motor of claim 1, wherein the plurality of permanent magnets are formed of ferrite or rare earth material.

13. The interior permanent magnet motor of claim 1, wherein each of the plurality of permanent magnets is formed in any one of a V shape, a C shape, and a U shape.

14. The interior permanent magnet motor of claim 1, wherein each of the plurality of permanent magnets is formed in a bar shape.

15. An interior permanent magnet motor comprising:

a stator having a plurality of slots;

a rotor rotatably disposed inside the stator;

a plurality of permanent magnets having a same polarity and disposed at intervals in a circumferential direction inside the rotor;

a rotation shaft disposed at a center of the rotor; and a plurality of flux barriers including a pair of left flux barriers and a pair of right flux barriers provided on left and right sides of one end of each of the plurality of permanent magnets, adjacent to an outer circumferential surface of the rotor, wherein the rotor has a number of magnetic poles including the plurality of permanent magnets, and a number of the plurality of permanent magnets is ½ of the number of magnetic poles of the rotor.

16. The interior permanent magnet motor of claim 15, wherein a pole arc angle $\theta m$ of each of the plurality of permanent magnets satisfies following formulas:

$$\theta_n \leq \theta_m < \theta_m + \theta_s/2$$

$$\theta n = 360/P$$

$$\theta s = 360/S$$

where P is the number of magnetic poles of the rotor, and S is the number of slots of the stator.

17. The interior permanent magnet motor of claim 15, wherein a pole arc angle $\theta m$ of each of the plurality of permanent magnets and the plurality of flux barriers satisfy following formulas:

$$\theta_s/2 \leq \theta_{ib} < \theta_n$$

$$\theta_n \leq \theta_m < \theta_{ob}$$

$$\theta m < \theta ob < \theta m + \theta s$$

$$\theta n = 360/P$$

$$\theta s = 360/S$$

where $\theta ib$ is an inner flux barrier angle of the permanent magnet, $\theta ob$ is an outer flux barrier angle of the permanent magnet, P is the number of magnetic poles of the rotor, and S is the number of slots of the stator.

18. The interior permanent magnet motor of claim 17, wherein an angle $\theta cp$ of a consequent pole which is one of the magnetic poles of the rotor, is formed between two adjacent permanent magnets among the plurality of permanent magnets, satisfies a following formula:

$$\theta ib/2 < \theta cp < \theta ob.$$

19. A compressor comprising:

an interior permanent magnet motor, comprising:

a stator having a plurality of slots;

a rotor rotatably disposed inside the stator;

a plurality of permanent magnets having a same polarity and disposed at intervals in a circumferential direction in the rotor; and a plurality of flux barriers including a first pair of flux barriers provided on a first end of each of the plurality of permanent magnets and a second pair of flux barriers provided on a second end of each of the plurality of permanent magnets, the plurality of flux barriers being adjacent to an outer circumferential surface of the rotor, wherein the rotor has a number of magnetic poles including the plurality of permanent magnets, and a ratio of a number of the plurality of slots of the stator to a number of magnetic poles of the rotor is 3:2 or 3:4, and wherein a number of the plurality of permanent magnets provided in the rotor is ½ of the number of magnetic poles of the rotor.

20. A refrigeration cycle apparatus comprising:
the compressor of claim 19.

* * * * *